US012462052B2

United States Patent
Wang et al.

(10) Patent No.: US 12,462,052 B2
(45) Date of Patent: Nov. 4, 2025

(54) USING CONTEXTUAL SECURITY CHALLENGES TO PREVENT BOT ATTACKS

(71) Applicant: OKTA, INC., San Francisco, CA (US)

(72) Inventors: Yu Wang, Toronto (CA); Karan Singh Chhina, Forest Hills, NY (US); Ian Hassard, Waterloo (CA); Ankur Priyadarshi Chauhan, Vallauris (FR); Ria Prakash, Toronto (CA); Matthew James Pereira, Halifax (CA); Alec Friedman, East Northport, NY (US); Joseph George Sokolon, Toronto (CA); Shaun Michael Tarves, Marlborough, MA (US)

( * ) Notice: Subject to any disclaimer, the term of this patent is extended or adjusted under 35 U.S.C. 154(b) by 141 days.

(21) Appl. No.: 18/489,794

(22) Filed: Oct. 18, 2023

(65) Prior Publication Data
US 2025/0131110 A1  Apr. 24, 2025

(51) Int. Cl.
*G06F 21/60* (2013.01)
*G06F 21/36* (2013.01)

(52) U.S. Cl.
CPC ............ *G06F 21/604* (2013.01); *G06F 21/36* (2013.01); *G06F 2221/2103* (2013.01); *G06F 2221/2133* (2013.01)

(58) Field of Classification Search
CPC .............................. G06F 21/604; G06F 21/36
USPC ........................................................... 726/28
See application file for complete search history.

(56) References Cited

U.S. PATENT DOCUMENTS

2020/0410082 A1* 12/2020 Sharieh ................. G06F 16/54

* cited by examiner

*Primary Examiner* — Anthony D Brown
(74) *Attorney, Agent, or Firm* — Holland & Hart LLP

(57) ABSTRACT

Computer-implemented methods, systems, and devices for generating security challenges are described. An identity management system may obtain image descriptions. The image descriptions may include a first image description set that corresponds to a sequence of events and a second image description set that is unassociated with the sequence of events. The identity management system may obtain images based on the image descriptions. The images may include a first image set that corresponds to the sequence of events and a second image set that is unassociated with the sequence of events. The identity management system may generate a security challenge using the images. The security challenge may request for a user to identify the sequence of events from the images. Identification of the sequence of events may be based on each image of the first image set being contextually relevant to the sequence of events.

20 Claims, 10 Drawing Sheets

USING CONTEXTUAL SECURITY CHALLENGES TO PREVENT BOT ATTACKS

FIELD OF TECHNOLOGY

The present disclosure relates generally to identity management, and more specifically to using contextual security challenges to prevent bot attacks.

BACKGROUND

An identity management system may be employed to manage and store various forms of user data, including usernames, passwords, email addresses, permissions, roles, group memberships, etc. The identity management system may provide authentication services for applications, devices, users, and the like. The identity management system may enable organizations to manage and control access to resources, for example, by serving as a central repository that integrates with various identity sources. The identity management system may provide an interface that enables users to access a multitude of applications with a single set of credentials.

SUMMARY

A computer-implemented method at a fraud detection service is described. The computer-implemented method may include obtaining information indicative of a set of multiple image descriptions, each image description of the set of multiple image descriptions describing a respective image of a set of multiple images, where the set of multiple image descriptions includes a first image description set that corresponds to a sequence of events and a second image description set that is unassociated with the sequence of events, obtaining the set of multiple images based on the information, where the set of multiple images includes a first image set that corresponds to the sequence of events based on the first image description set, and a second image set that is unassociated with the sequence of events based on the second image description set, and generating a security challenge using the set of multiple images, where the security challenge includes a request for a user to identify the sequence of events from among the set of multiple images, and where identification of the sequence of events is based on each image of the first image set being contextually relevant to the sequence of events.

A fraud detection service for generating security challenges is described. The fraud detection service may include one or more memories storing processor executable code, and one or more processors coupled with the one or more memories. The one or more processors may individually or collectively operable to execute the code to cause the fraud detection service to obtain information indicative of a set of multiple image descriptions, each image description of the set of multiple image descriptions describing a respective image of a set of multiple images, where the set of multiple image descriptions includes a first image description set that corresponds to a sequence of events and a second image description set that is unassociated with the sequence of events, obtain the set of multiple images based on the information, where the set of multiple images includes a first image set that corresponds to the sequence of events based on the first image description set, and a second image set that is unassociated with the sequence of events based on the second image description set, and generate a security challenge using the set of multiple images, where the security challenge includes a request for a user to identify the sequence of events from among the set of multiple images, and where identification of the sequence of events is based on each image of the first image set being contextually relevant to the sequence of events.

Another fraud detection service for generating security challenges is described. The fraud detection service may include means for obtaining information indicative of a set of multiple image descriptions, each image description of the set of multiple image descriptions describing a respective image of a set of multiple images, where the set of multiple image descriptions includes a first image description set that corresponds to a sequence of events and a second image description set that is unassociated with the sequence of events, means for obtaining the set of multiple images based on the information, where the set of multiple images includes a first image set that corresponds to the sequence of events based on the first image description set, and a second image set that is unassociated with the sequence of events based on the second image description set, and means for generating a security challenge using the set of multiple images, where the security challenge includes a request for a user to identify the sequence of events from among the set of multiple images, and where identification of the sequence of events is based on each image of the first image set being contextually relevant to the sequence of events.

A non-transitory computer-readable medium storing code for generating security challenges is described. The code may include instructions executable by a processor to obtain information indicative of a set of multiple image descriptions, each image description of the set of multiple image descriptions describing a respective image of a set of multiple images, where the set of multiple image descriptions includes a first image description set that corresponds to a sequence of events and a second image description set that is unassociated with the sequence of events, obtain the set of multiple images based on the information, where the set of multiple images includes a first image set that corresponds to the sequence of events based on the first image description set, and a second image set that is unassociated with the sequence of events based on the second image description set, and generate a security challenge using the set of multiple images, where the security challenge includes a request for a user to identify the sequence of events from among the set of multiple images, and where identification of the sequence of events is based on each image of the first image set being contextually relevant to the sequence of events.

In some examples of the computer-implemented method, fraud detection services, and non-transitory computer-readable medium described herein, generating the security challenge may include operations, features, means, or instructions for generating a first subset of images including one or more images of the first image set and generating a second subset of images including an image of the first image set and one or more images of the second image set, where the request to identify the sequence of events includes a first request for the user to identify the image from among the second subset of images based on the first subset of images, and where identifying the image identifies the sequence of events.

In some examples of the computer-implemented method, fraud detection services, and non-transitory computer-readable medium described herein, the one or more images of the first image set include a first image corresponding to a first event of the sequence of events and a second images corresponding to a second event of the sequence of events and identification of the image from among the second subset of images may be based on the image corresponding to a third event of the sequence of events.

In some examples of the computer-implemented method, fraud detection services, and non-transitory computer-readable medium described herein, the third event includes a last event of the sequence of events.

In some examples of the computer-implemented method, fraud detection services, and non-transitory computer-readable medium described herein, obtaining the information may include operations, features, means, or instructions for obtaining the information using a first machine learning model, where the information may be based on one or more prompts, and where each prompt corresponds to a respective task performed by the first machine learning model.

In some examples of the computer-implemented method, fraud detection services, and non-transitory computer-readable medium described herein, a first prompt of the one or more prompts includes a first request for the first machine learning model to generate the first image description set, each image description of the first image description set describing a respective event of the sequence of events and a second prompt of the one or more prompts includes a second request for the first machine learning model to generate the second image description set, each image description of the second image description set describing a respective event that may be unassociated with the sequence of events.

In some examples of the computer-implemented method, fraud detection services, and non-transitory computer-readable medium described herein, a third prompt of the one or more prompts includes a third request for the first machine learning model to eliminate an image description from the second image description set based on the image description being contextually relevant to a combination of at least two image descriptions of the first image description set.

In some examples of the computer-implemented method, fraud detection services, and non-transitory computer-readable medium described herein, a fourth prompt of the one or more prompts includes a fourth request for the first machine learning model to eliminate an image description from the second image description set based on a respective difference between the image description and one or more image descriptions of the first image description set satisfying a threshold.

In some examples of the computer-implemented method, fraud detection services, and non-transitory computer-readable medium described herein, a fifth prompt of the one or more prompts includes a fifth request for the first machine learning model to add noise, or an object, or both, to at least one image description of the set of multiple image descriptions.

In some examples of the computer-implemented method, fraud detection services, and non-transitory computer-readable medium described herein, the one or more prompts indicate one or more rules associated with generation of the set of multiple images.

In some examples of the computer-implemented method, fraud detection services, and non-transitory computer-readable medium described herein, the one or more rules include a rule pertaining to a quantity of events associated with each image description, a rule pertaining to objects included in the first image description set, a rule pertaining to objects included in the second image description set, a rule pertaining to objects included in each image of the set of multiple images, a rule pertaining to a structure of the set of multiple image descriptions, or a rule pertaining to decoy objects included in at least a portion of the set of multiple images, or any combination thereof.

In some examples of the computer-implemented method, fraud detection services, and non-transitory computer-readable medium described herein, the one or more prompts include a first example of the first image description set, or a second example of the second image description set, or both.

In some examples of the computer-implemented method, fraud detection services, and non-transitory computer-readable medium described herein, the first machine learning model includes a large language model.

In some examples of the computer-implemented method, fraud detection services, and non-transitory computer-readable medium described herein, obtaining the set of multiple images may include operations, features, means, or instructions for obtaining the set of multiple images using a second machine learning model, where the set of multiple images may be based on a set of multiple prompts, and where each prompt of the set of multiple prompts corresponds to a respective image description of the set of multiple image descriptions.

Some examples of the computer-implemented method, fraud detection services, and non-transitory computer-readable medium described herein may further include operations, features, means, or instructions for obtaining each prompt of the set of multiple prompts includes a natural language description and the second machine learning model includes a text-to-image model.

Some examples of the computer-implemented method, fraud detection services, and non-transitory computer-readable medium described herein may further include operations, features, means, or instructions for obtaining the set of multiple prompts based on modifying the set of multiple image descriptions in accordance with the second machine learning model.

Some examples of the computer-implemented method, fraud detection services, and non-transitory computer-readable medium described herein may further include operations, features, means, or instructions for obtaining second information indicative of a second sequence of events based on the set of multiple images, where the second information may be obtained using one or more machine learning models and outputting the security challenge to a device associated with a client of the fraud detection service based on the second sequence of events being different from the sequence of events.

In some examples of the computer-implemented method, fraud detection services, and non-transitory computer-readable medium described herein, the set of multiple image descriptions may be associated with a topic, the topic includes a category of objects, and each image of the set of multiple images includes one or more objects corresponding to the category of objects.

A computer-implemented method at a fraud detection service is described. The computer-implemented method may include obtaining information indicative of a first request from a device associated with a client of the fraud detection service and outputting a security challenge to the device in response to the first request, the security challenge including a second request for a user of the device to identify a sequence of events from among a set of multiple images, where the set of multiple images includes a first image set that corresponds to the sequence of events and a second image set that is unassociated with the sequence of events.

A fraud detection service for generating security challenges is described. The fraud detection service may include one or more memories storing processor executable code, and one or more processors coupled with the one or more memories. The one or more processors may individually or collectively operable to execute the code to cause the fraud detection service to obtain information indicative of a first request from a device associated with a client of the fraud detection service and output a security challenge to the device in response to the first request, the security challenge including a second request for a user of the device to identify a sequence of events from among a set of multiple images, where the set of multiple images includes a first image set that corresponds to the sequence of events and a second image set that is unassociated with the sequence of events.

Another fraud detection service for generating security challenges is described. The fraud detection service may include means for obtaining information indicative of a first request from a device associated with a client of the fraud detection service and means for outputting a security challenge to the device in response to the first request, the security challenge including a second request for a user of the device to identify a sequence of events from among a set of multiple images, where the set of multiple images includes a first image set that corresponds to the sequence of events and a second image set that is unassociated with the sequence of events.

A non-transitory computer-readable medium storing code for generating security challenges is described. The code may include instructions executable by a processor to obtain information indicative of a first request from a device associated with a client of the fraud detection service and output a security challenge to the device in response to the first request, the security challenge including a second request for a user of the device to identify a sequence of events from among a set of multiple images, where the set of multiple images includes a first image set that corresponds to the sequence of events and a second image set that is unassociated with the sequence of events.

In some examples of the computer-implemented method, fraud detection services, and non-transitory computer-readable medium described herein, the second request for the user to identify the sequence of events includes a request for the user to identify an image of the first image set based on a first subset of images, identification of the image may be from among a second subset of images and identifies the sequence of events and the first subset of images includes one or more images of the first image set and the second subset of images includes the image and one or more images of the second image set.

In some examples of the computer-implemented method, fraud detection services, and non-transitory computer-readable medium described herein, the one or more images of the first image set include a first image corresponding to a first event of the sequence of events and a second images corresponding to a second event of the sequence of events and the identification of the image from among the second subset of images may be based on the image corresponding to a third event of the sequence of events.

Some examples of the computer-implemented method, fraud detection services, and non-transitory computer-readable medium described herein may further include operations, features, means, or instructions for outputting a second security challenge, where the second security challenge includes a third request for the user of the device to identify a third sequence of events from among a second set of multiple images.

Some examples of the computer-implemented method, fraud detection services, and non-transitory computer-readable medium described herein may further include operations, features, means, or instructions for obtaining, from the device in response to the security challenge, second information indicative of a second sequence of events, where outputting the second security challenge may be based on the second sequence of events being the same as the sequence of events.

Some examples of the computer-implemented method, fraud detection services, and non-transitory computer-readable medium described herein may further include operations, features, means, or instructions for obtaining, from the device in response to the security challenge, second information indicative of a second sequence of events, where outputting the second security challenge may be based on the second sequence of events being different from the sequence of events.

Some examples of the computer-implemented method, fraud detection services, and non-transitory computer-readable medium described herein may further include operations, features, means, or instructions for determining that the second information corresponds to a failed attempt to solve the security challenge based on the second sequence of events being different from the sequence of events and excluding the security challenge from a set of security challenges based on the failed attempt.

In some examples of the computer-implemented method, fraud detection services, and non-transitory computer-readable medium described herein, excluding the security challenge from the set of security challenges may include operations, features, means, or instructions for excluding the security challenge from the set of security challenges based on determining that a rate of failed attempts to solve the security challenge satisfies a threshold.

DETAILED DESCRIPTION

Figure 1:
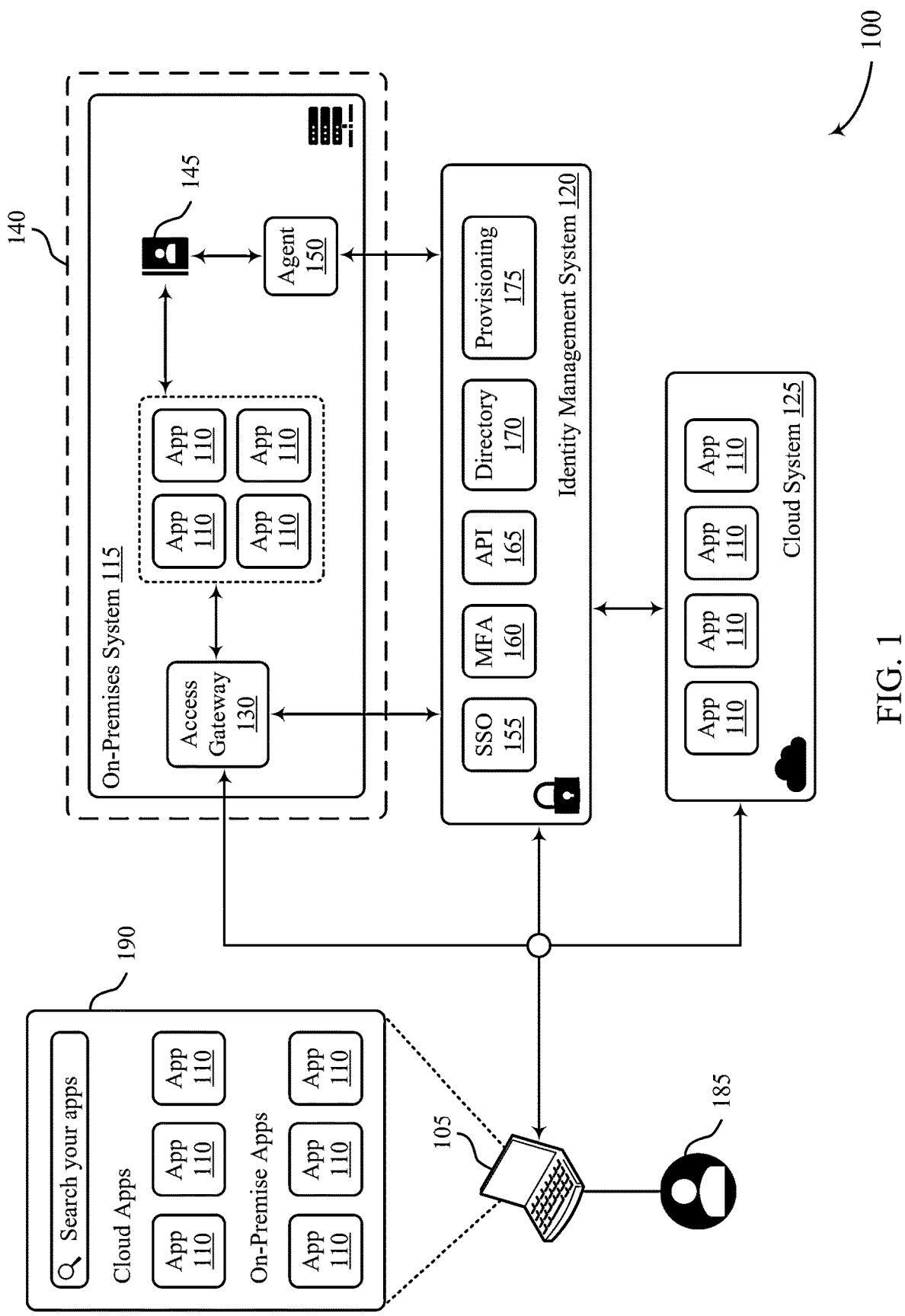
FIG. 1 illustrates an example of a computing system that supports using contextual security challenges to prevent bot attacks in accordance with aspects of the present disclosure.

Some software platforms may use security tests to differentiate between humans and automated scripts, which may also be referred to as bots. For example, a software platform may use a turing test to tell humans and bots apart, such as a CAPTCHA® (Completely Automated Public Turing test to tell Computers and Humans Apart). Some security tests, also referred to herein as security challenges, may be designed to protect against various forms of account creation by bots, as well as against automated attacks. In some cases, however, bots may be able to solve security challenges relatively easily. For example, some security challenges correspond to relatively simple (e.g., standard) image processing tasks, such as identification or classification, which bots may solve relatively easily. Additionally, malicious actors may employ various services that solve turing tests. Accordingly, such security challenges may be relatively ineffective at differentiating between humans and automated bots or scripts and, as such, may lead to security vulnerabilities.

Various aspects of the present disclosure generally relate to techniques for using contextual security challenges to prevent bot attacks and, more specifically, to a framework for generating security challenges that use contextual sequential image completion. For example, it may be relatively difficult for machine learning to extract context of a story from images. That is, extracting content from an image may necessitate relatively low computational complexity, while extracting context from images may necessitate relatively high computation complexity. As such, developing a machine learning model that is capable of solving contextual security challenges may be relatively time consuming and computationally expensive. For example, it may be more computationally expensive to solve a contextual security challenge (e.g., in real-time via machine learning) than to create a contextual security challenge (e.g., in batches). In other words, the nature of contextual security challenges necessitates that the contextual security challenges be solved in real-time, however, such security challenges may be created in non-real time such that security challenges may be created in batches or reused, or both. Accordingly, a computational cost associated with solving a security challenge may be greater than a computational cost associated with creating the security challenge. As such, a software platform (e.g., a fraud detection service of a software platform) may use one or more machine learning models to generate security challenges that use contextual sequential image completion. The fraud detection service may use a first machine learning model to generate stories (e.g., automatically). For example, the fraud detection service may obtain information from the first machine learning model that is indicative of image descriptions and each image description may describe a respective image. The first machine learning model may be an example of a large language model (e.g., any large language model capable of generating stories). Some of the image descriptions may correspond to images of a story (e.g., a sequence of events). For example, a first set of image descriptions may correspond to the story. Images that correspond to a story may be referred to herein as story images. Additionally, some of the image descriptions may be unassociated with the story. For example, a second set of image descriptions may correspond to images that are unassociated with the story. Images unassociated with a story may be referred to herein as decoy images.

The fraud detection service may use a second machine learning model to generate story images (and decoys images) based on the generated stories. That is, the fraud detection service may use the second machine learning model to obtain images based on the image descriptions obtained from the first machine learning model. Accordingly, the generated images may include a first set of images that are based on the first set of image descriptions and correspond to the story. Additionally, the generated images may include a second set of images that are based on the second set of image descriptions and are unassociated with the story. In other words, the fraud detection service may input the first set of image descriptions and the second set of image descriptions into the second machine learning model to obtain the story images and the decoy images, respectively.

The fraud detection service may generate a security challenge using the generated images. The security challenge may include a request for a user (e.g., a bot or a human) to identify the story from the generated images, where identification of the story may be based on each story image being contextually relevant to the story. In other words, the fraud detection service may use the story images and the decoy images to generate a contextual sequential image completion test for a user. For example, the story may correspond to a sequence of related events in which each story image corresponds to an event of the sequence of related events. Thus, successfully identifying the story may include identifying the story images and also identifying a sequential order for the story images. That is, identifying and ordering the story images in accordance with the sequential order forms the story (e.g., tells the story, makes up the story).

As an illustrative example, the security challenge may provide (or otherwise indicate) two story images to the user in accordance with the sequential order, such that the two story images form a portion of the story. Additionally, the security challenge may request that the user identify a third image that completes the story. In some examples, the security challenge may request that the user select the third image from among a set of images, which may include one of the story images (e.g., the story image that completes the story, also referred to herein as a target image) and one or more decoy images. One or more objects may be common to both the target image and the decoy images. That is, the decoy images may have the same or relatively similar objects or characters as the target image but in a different context. As such, the user may use context to identify the target image from among the set of images. As described herein context may refer to circumstances that form a setting for, and may be used to understand, an event or a sequence of events. Thus, the user may successfully identify the target images based on the context of the target image aligning with the context of the provided story images. That is, the context of objects and characters within in the target image may be consistent with an event that completes the sequence of related events (e.g., the story). The security challenge may be relatively easy for humans and relatively difficult for bots (e.g., it may be relatively unlikely that a bot will successfully identify the target image based on context). That is, completing the story based on context may be relatively easy for humans, while bots may be incapable of completing the story based on context (or it may be relatively difficult for bots to complete the story based on context). Thus, the framework for generating security challenges that use contextual sequential image completion, as described herein, may provide for improved differentiation between humans and automated bots or scripts and, accordingly, increased security.

Aspects of the disclosure are initially described in the context of a computing system. Aspects of the disclosure are also described in the context of a user interface, a block diagram, and a process flow. Aspects of the disclosure are further illustrated by and described with reference to apparatus diagrams, system diagrams, and flowcharts that relate to using contextual security challenges to prevent bot attacks.

FIG. 1 illustrates an example of a computing system 100 that supports using contextual security challenges to prevent bot attacks in accordance with various aspects of the present disclosure. The computing system 100 includes a computing device 105 (such as a desktop, laptop, smartphone, tablet, or the like), an on-premises system 115, an identity management system 120, and a cloud system 125, which may communicate with each other via a network, such as a wired network (e.g., the Internet), a wireless network (e.g., a cellular network, a wireless local area network (WLAN)), or both. In some cases, the network may be implemented as a public network, a private network, a secured network, an unsecured network, or any combination thereof. The network may include various communication links, hubs, bridges, routers, switches, ports, or other physical and/or logical network components, which may be distributed across the computing system 100.

The on-premises system 115 (also referred to as an on-premises infrastructure or environment) may be an example of a computing system in which a client organization owns, operates, and maintains its own physical hardware and/or software resources within its own data center(s) and facilities, instead of using cloud-based (e.g., off-site) resources. Thus, in the on-premises system 115, hardware, servers, networking equipment, and other infrastructure components may be physically located within the "premises" of the client organization, which may be protected by a firewall 140 (e.g., a network security device or software application that is configured to monitor, filter, and control incoming/outgoing network traffic). In some examples, users may remotely access or otherwise utilize compute resources of the on-premises system 115, for example, via a virtual private network (VPN).

In contrast, the cloud system 125 (also referred to as a cloud-based infrastructure or environment) may be an example of a system of compute resources (such as servers, databases, virtual machines, containers, and the like) that are hosted and managed by a third-party cloud service provider using third-party data center(s), which can be physically co-located or distributed across multiple geographic regions. The cloud system 125 may offer high scalability and a wide range of managed services, including (but not limited to) database management, analytics, machine learning, artificial intelligence (AI), etc. Examples of cloud systems 125 include (AMAZON WEB SERVICES) AWS®, MICROSOFT AZURE®, GOOGLE CLOUD PLATFORM®, ALIBABA CLOUD®, ORACLE® CLOUD INFRASTRUCTURE (OCI), and the like.

The identity management system 120 may support one or more services, such as a single sign-on (SSO) service 155, a multi-factor authentication (MFA) service 160, an application programming interface (API) service 165, a directory management service 170, or a provisioning service 175 for various on-premises applications 110 (e.g., applications 110 running on compute resources of the on-premises system 115) and/or cloud applications 110 (e.g., applications 110 running on compute resources of the cloud system 125), among other examples of services. The SSO service 155, the MFA service 160, the API service 165, the directory management service 170, and/or the provisioning service 175 may be individually or collectively provided (e.g., hosted) by one or more physical machines, virtual machines, physical servers, virtual (e.g., cloud) servers, data centers, or other compute resources managed by or otherwise accessible to the identity management system 120.

A user 185 may interact with the computing device 105 to communicate with one or more of the on-premises system 115, the identity management system 120, or the cloud system 125. For example, the user 185 may access one or more applications 110 by interacting with an interface 190 of the computing device 105. In some implementations, the user 185 may be prompted to provide some form of identification (such as a password, personal identification number (PIN), biometric information, or the like) before the interface 190 is presented to the user 185. In some implementations, the user 185 may be a developer, customer, employee, vendor, partner, or contractor of a client organization (such as a group, business, enterprise, non-profit, or startup that uses one or more services of the identity management system 120). The applications 110 may include one or more on-premises applications 110 (hosted by the on-premises system 115), mobile applications 110 (configured for mobile devices), and/or one or more cloud applications 110 (hosted by the cloud system 125).

The SSO service 155 of the identity management system 120 may allow the user 185 to access multiple applications 110 with one or more credentials. Once authenticated, the user 185 may access one or more of the applications 110 (for example, via the interface 190 of the computing device 105). That is, based on the identity management system 120 authenticating the identity of the user 185, the user 185 may obtain access to multiple applications 110, for example, without having to re-enter the credentials (or enter other credentials). The SSO service 155 may leverage one or more authentication protocols, such as Security Assertion Markup Language (SAML) or OpenID Connect (OIDC), among other examples of authentication protocols. In some examples, the user 185 may attempt to access an application 110 via a browser. In such examples, the browser may be redirected to the SSO service 155 of the identity management system 120, which may serve as the identity provider (IdP). For example, in some implementations, the browser (e.g., the user's request communicated via the browser) may be redirected by an access gateway 130 (e.g., a reverse proxy-based virtual application configured to secure web applications 110 that may not natively support SAML or OIDC).

In some examples, the access gateway 130 may support integrations with legacy applications 110 using hypertext transfer protocol (HTTP) headers and Kerberos tokens, which may offer universal resource locator (URL)-based authorization, among other functionalities. In some examples, such as in response to the user's request, the IdP may prompt the user 185 for one or more credentials (such as a password, PIN, biometric information, or the like) and the user 185 may provide the requested authentication credentials to the IdP. In some implementations, the IdP may leverage the MFA service 160 for added security. The IdP may verify the user's identity by comparing the credentials provided by the user 185 to credentials associated with the user's account. For example, one or more credentials associated with the user's account may be registered with the IdP (e.g., previously registered, or otherwise authorized for authentication of the user's identity via the IdP). The IdP may generate a security token (such as a SAML token or Oath 2.0 token) containing information associated with the identity and/or authentication status of the user 185 based on successful authentication of the user's identity.

The IdP may send the security token to the computing device 105 (e.g., the browser or application 110 running on the computing device 105). In some examples, the application 110 may be associated with a service provider (SP), which may host or manage the application 110. In such examples, the computing device 105 may forward the token to the SP. Accordingly, the SP may verify the authenticity of the token and determine whether the user 185 is authorized to access the requested applications 110. In some examples, such as examples in which the SP determines that the user 185 is authorized to access the requested application, the SP may grant the user 185 access to the requested applications 110, for example, without prompting the user 185 to enter credentials (e.g., without prompting the user to log-in). The SSO service 155 may promote improved user experience (e.g., by limiting the number of credentials the user 185 has to remember/enter), enhanced security (e.g., by leveraging secure authentication protocols and centralized security policies), and reduced credential fatigue, among other benefits.

The MFA service 160 of the identity management system 120 may enhance the security of the computing system 100 by prompting the user 185 to provide multiple authentication factors before granting the user 185 access to applications 110. These authentication factors may include one or more knowledge factors (e.g., something the user 185 knows, such as a password), one or more possession factors (e.g., something the user 185 is in possession of, such as a mobile app-generated code or a hardware token), or one or more inherence factors (e.g., something inherent to the user 185, such as a fingerprint or other biometric information). In some implementations, the MFA service 160 may be used in conjunction with the SSO service 155. For example, the user 185 may provide the requested login credentials to the identity management system 120 in accordance with an SSO flow and, in response, the identity management system 120 may prompt the user 185 to provide a second factor, such as a possession factor (e.g., a one-time passcode (OTP), a hardware token, a text message code, an email link/code). The user 185 may obtain access (e.g., be granted access by the identity management system 120) to the requested applications 110 based on successful verification of both the first authentication factor and the second authentication factor.

The API service 165 of the identity management system 120 can secure APIs by managing access tokens and API keys for various client organizations, which may enable (e.g., only enable) authorized applications (e.g., one or more of the applications 110) and authorized users (e.g., the user 185) to interact with a client organization's APIs. The API service 165 may enable client organizations to implement customizable login experiences that are consistent with their architecture, brand, and security configuration. The API service 165 may enable administrators to control user API access (e.g., whether the user 185 and/or one or more other users have access to one or more particular APIs). In some examples, the API service 165 may enable administrators to control API access for users via authorization policies, such as standards-based authorization policies that leverage OAuth 2.0. The API service 165 may additionally, or alternatively, implement role-based access control (RBAC) for applications 110. In some implementations, the API service 165 can be used to configure user lifecycle policies that automate API onboarding and off-boarding processes.

The directory management service 170 may enable the identity management system 120 to integrate with various identity sources of client organizations. In some implementations, the directory management service 170 may communicate with a directory service 145 of the on-premises system 115 via a software agent 150 installed on one or more computers, servers, and/or devices of the on-premises system 115. Additionally, or alternatively, the directory management service 170 may communicate with one or more other directory services, such as one or more cloud-based directory services. As described herein, a software agent 150 generally refers to a software program or component that operates on a system or device (such as a device of the on-premises system 115) to perform operations or collect data on behalf of another software application or system (such as the identity management system 120).

The provisioning service 175 of the identity management system 120 may support user provisioning and deprovisioning. For example, in response to an employee joining a client organization, the identity management system 120 may automatically create accounts for the employee and provide the employee with access to one or more resources via the accounts. Similarly, in response to the employee (or some other employee) leaving the client organization, the identity management system 120 may autonomously deprovision the employee's accounts and revoke the employee's access to the one or more resources (e.g., with little to no intervention from the client organization). The provisioning service 175 may maintain audit logs and records of user deprovisioning events, which may help the client organization demonstrate compliance and track user lifecycle changes. In some implementations, the provisioning service 175 may enable administrators to map user attributes and roles (e.g., permissions, privileges) between the identity management system 120 and connected applications 110, ensuring that user profiles are consistent across the identity management system 120, the on-premises system 115, and the cloud system 125.

Although not depicted in the example of FIG. 1, a person skilled in the art would appreciate that the identity management system 120 may support or otherwise provide access to any number of additional or alternative services, applications 110, platforms, providers, or the like. In other words, the functionality of the identity management system 120 is not limited to the exemplary components and services mentioned in the preceding description of the computing system 100. The description herein is provided to enable a person skilled in the art to make or use the present disclosure. Various modifications to the present disclosure will be readily apparent to those skilled in the art, and the generic principles defined herein may be applied to other variations without departing from the scope of the present disclosure. Accordingly, the present disclosure is not limited to the examples and designs described herein, but is to be accorded the broadest scope consistent with the principles and novel features disclosed herein.

The computing system 100 may be susceptible to bot attacks (e.g., automated attacks that are set up by malicious actors and enabled by bots that mimic human behavior and duplicate it). For example, bot attacks may be deployed against various components of the computing system 100, such as a website (e.g., running on the computing device 105), a user (e.g., operating the computing device 105), a server, or an API, among other components. A security test (e.g., CAPTCHA® solution) may be used to prevent bot attacks. However, the security test may be relatively easy for bots to solve. For example, the security test may be solved using relatively low complexity scripts or pattern recognition.

The identity management system 120 may include a fraud detection service that supports a framework for generating security challenges that use contextual sequential image completion. For example, extracting content from an image may necessitate relatively low computational complexity, while extracting context from images may necessitate relatively high computation complexity. As such, the fraud detection service may use one or more machine learning models to generate security challenges that use contextual sequential image completion. The fraud detection service may use a first type of machine learning model to obtain information that is indicative of multiple image descriptions for multiple images. The fraud detection service may then input the information into a second type of machine learning model to generate the multiple images. The multiple images may include story images and decoys images. The fraud detection service may generate a security challenge using the generated images. The security challenge may include a request for a user of the computing device 105 to identify the story from the generated images. The user may be a human and may identify the story based on each story image being contextually relevant to the story. For example, the story may correspond to a sequence of related events. The user may identify the story images (e.g., from among the generated images, which includes the story images and the decoy images) and may also identifying a sequential order for the story images, such that ordering the story images in accordance with the sequential order forms the sequence of related events (e.g., tells the story, makes up the story).

Figure 2:
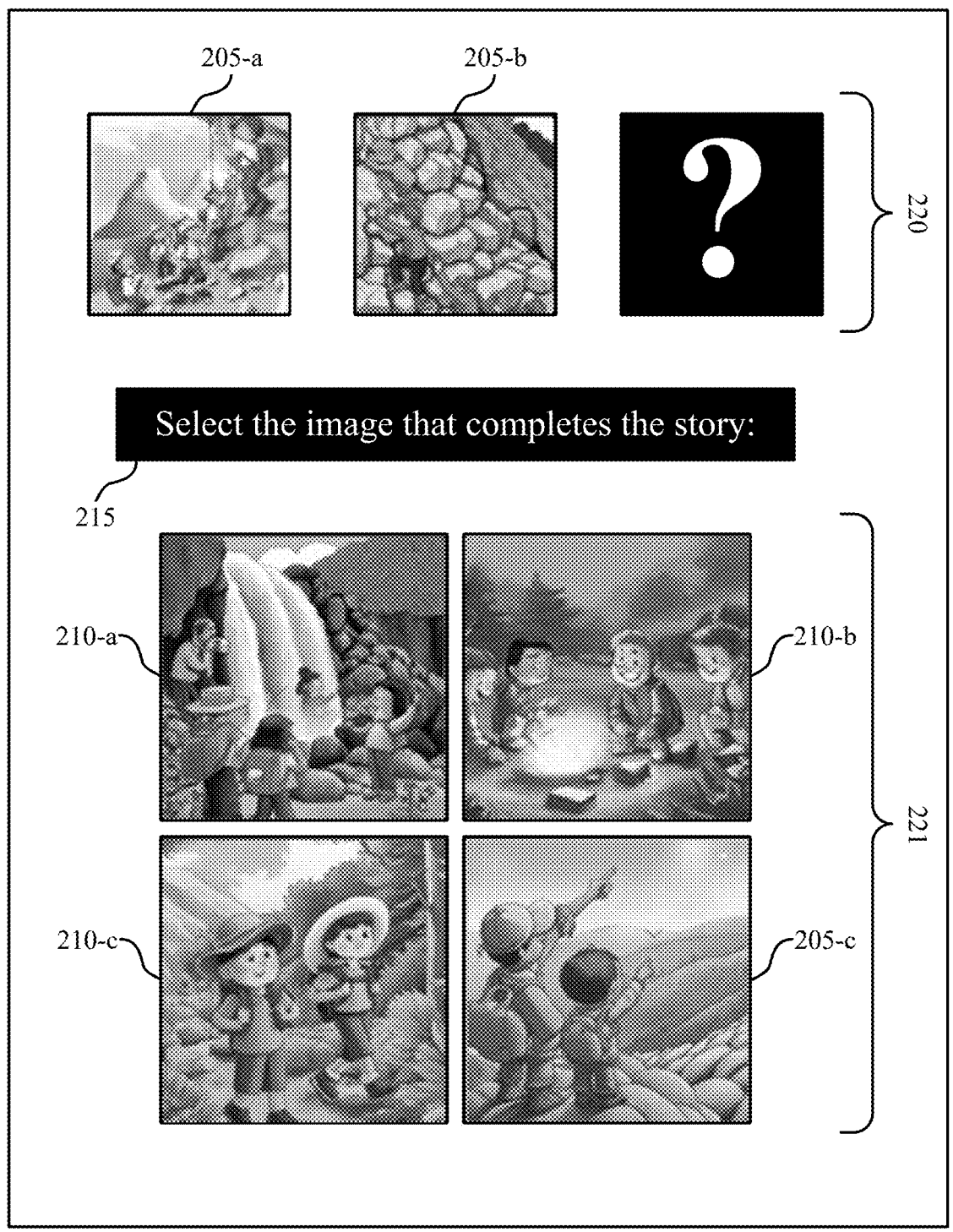
FIG. 2 shows an example of a user interface that supports using contextual security challenges to prevent bot attacks in accordance with aspects of the present disclosure.

FIG. 2 shows an example of a user interface 200 that supports using contextual security challenges to prevent bot attacks in accordance with aspects of the present disclosure. The user interface 200 may implement aspects of the computing system 100 illustrated by and described with reference to FIG. 1. For example, the user interface 200 may be displayed or otherwise rendered on the computing device 105 as illustrated by and described with reference to FIG. 1. The user interface 200 illustrates an example of a security challenge that uses contextual sequential image completion.

Security challenges (e.g., CAPTCHA®, reCAPTCH®) may be used as a security measure on websites and applications to differentiate between humans and automated bots (e.g., scripts). Such security challenges may be designed to protect against various forms of online attacks, such as spamming, data scraping, account creation by bots, and automated attacks. Bots may solve some types of security challenges relatively easily, such as security challenges that rely on image processing tasks (e.g., image identification or image classification tasks). Accordingly, malicious actors may employ services to solve such types of security challenges (e.g., at scale), for example, using machine learning. In some cases, machine learning may perform such tasks at human-level performance. However, context may be relatively difficult for machine learning to understand because, for example, machine learning models are trained off data and cannot experience the world in the same way as humans. Therefore, to prevent bot attacks, a fraud detection service may use contextual sequential image completion security challenges. For example, the fraud detection service may (automatically) create stories using a large language model and may convert the generated stories into story images using a text-to-image system. The fraud detection service may also use the large language model and text-to-image system to generate other images that include objects that are similar to objects in the story images but in different contexts. The other images may therefore serve as decoys. For example, machine learning may determine the content of an image (e.g., objects within the image) relatively easily, but it may be relatively difficult for machine learning to extract the context of a story from images. Thus, it may be relatively difficult for machine learning to differentiate the decoy images from the story images, for example, if the decoy images and the story images include the same or similar content (e.g., the same or similar objects).

As illustrated in the example of FIG. 2, the fraud detection service may obtain information from a device associated with a client of the fraud detection service. The information may be indicative of a request (e.g., an access request, a request to create an account with an application, a request to log into an account with an application). In response to the request, the fraud detection service may output (e.g., render) a security challenge via the user interface 200. The security challenge may provide the user (e.g., may display on the user interface 200) a first image set 220 that includes a story image 205-*a* and a story image 205-*b*. That is, generating the security challenge may include generating the first image set 220 that includes one or more of the story images 205. The story image 205-*a* and the story image 205-*b* may be displayed on the user interface 200 in a sequential order, such that the story image 205-*a* and the story image 205-*b* form a portion of a story. That is, each of the story images 205 may correspond to a respective event of a sequence of related events that (collectively) form a story and, as such, the story image 205-*a* and the story image 205-*b* may form a portion of the story. Additionally, the security challenge may display on the user interface 200 a second image set 221 that includes a story image 205-*c* and decoy images 210 (e.g., a decoy image 210-*a*, a decoy image 210-*b*, a decoy image 210-*c*). That is, generating the security challenge may include generating the second image set 221 that includes one of the story images 205 and the decoy images 210. The security challenge may include a request 215 for the user to select the image that completes the story. In other words, the request 215 may be a request for the user of the device to identify a sequence of events from among the story images 205 (which correspond to the sequence of events) and the decoy images 210 (which are unassociated with the sequence of events). As illustrated in the example of FIG. 2, the security challenge may provide the first image set 220 to the user to, for example, aid the user in identifying the story. In such examples, the request 215 may be interpreted as a request for the user to select a target image (e.g., the story image 205-*c*, the image that completes the story) from among the second image set 221. That is, the request to identify the sequence of events may include a request for the user to identify the target image from among the second image set 221 based on the first image set 220. As such, identifying the target image may identify the sequence of events. Although the example of FIG. 2 illustrates the target image corresponding to a last event of the sequence of related events, it is to be understood that the target image may correspond to any event of the sequence of related events and the examples described herein should not be considered limiting to the scope covered by the claims or the disclosure. Additionally, although the example of FIG. 2 illustrates a request to select a single target image, it is to be understood that the security challenge may request for the user to select any number of target images and the examples described herein should not be considered limiting to the scope covered by the claims or the disclosure. Moreover, although the request 215 illustrates a request to select the image that completes the story, the request 215 may include other phrasing capable of prompting or otherwise triggering a user to identify a sequence of related events from among multiple images and the examples described herein should not be considered limiting to the scope covered by the claims or the disclosure.

As illustrated in the example of FIG. 2, one or more objects may be common to both the story image 205-c and the decoy images 210. A machine learning system that tries to solve the security challenge may use a combination of object identification computer vision and a natural language processing (NLP) model. For example, the machine learning system may first use the object identification computer vision to identify (e.g., determine) objects included in each of the images in the first image set 220 and each of the images included in the second image set 221. For the first image set 220, the object identification computer vision model may determine (e.g., output):

story image 205-a includes: kids, hats, backpack, rope, mountain, mountain climbing;
story image 205-b includes: kids, mountain, rocks, mountain climbing.

Additionally, for the second image set 221, the object identification computer vision model may determine (e.g., output):

decoy image 210-a includes: waterfall, kids, hat, backpack, rocks, mountain;
decoy image 210-b includes: kids, fire, camping, field;
decoy image 210-c includes: kids, hat, hiking, field, shoes, tree;
story image 205-c includes: kids, hands, backpack, field, hills.

The machine learning model may then use the NLP model to solve the security challenge based on the identified objects. However, one or more of the objects identified for the story image 205-c (e.g., kids, backpack, field) may also be identified for one or more of the decoy images 210. Additionally, one or more of the objects identified for the story image 205-a and the story image 205-b (e.g., mountain, backpack, rocks, hats, kids) may also be identified for one or more of the decoy images 210. In some examples, one or more objects may correspond to noise or a distraction object. For example, one or more decoy images 210 and one or more story images 205 may include an object (e.g., a hat) that may not be part of (or be contextually relevant to) the story. That is, a hat may be included in one or more decoy images 210 and one or more story images 205, but may not pertain to the story formed by the story images. Thus, the output from the object identification computer vision model may be insufficient for the NLP model to solve the security challenge. That is, the output from the object identification computer vision model may lack sufficient information for the NLP model to determine that the story image 205-c (rather than one of the decoy images 210) completes the story. In other words, the object identification computer vision model may be incapable of extracting a sufficient quantity of words (e.g., thousands of words) for each of the images, or may be incapable of extracting the sufficient quantity of words in a way that the NLP model could making sense of. Conversely, a human user may successfully identify the story image 205-c as the target image based on the context of the story image 205-c aligning with the context of the story image 205-a and the story image 205-b. For example, the context of objects and characters within in the story image 205-a may be consistent with a first event of the story (e.g., kids standing on the bottom of a mountain) and the context of objects and characters within the story image 205-c may be consistent with a second event of the story (e.g., kids climbing a mountain). The human user may be capable of determining that the context of objects and characters within the story image 205-c may be consistent with a third event that completes the story (e.g., kids standing on the top of a hill). In other words, the human user may use context to determine that an image illustrating kids standing on the bottom of a mountain (e.g., the story image 205-a), an image illustrating kids climbing a mountain (e.g., the story image 205-b), and an image illustrating kids standing on the top of a hill (e.g., the story image 205-c) correspond to a sequence of related events (e.g., a story). Thus, the human user may select the story image 205-c in response to the request 215 (e.g., rather than selecting one of the decoy images 210). As such, the security challenge may be relatively easy for the human user to solve and relatively difficult for bots to solve. That is, it may be relatively easy for a human user, and relatively difficult for a bot, to determine that the story images 205 collectively form a story based on context (e.g., to determine that each of the story images 205 are contextually relevant to a related sequence of events that make up the story). As such, the security challenge may provide for improved differentiation between humans and bots and increased security.

Figure 3:
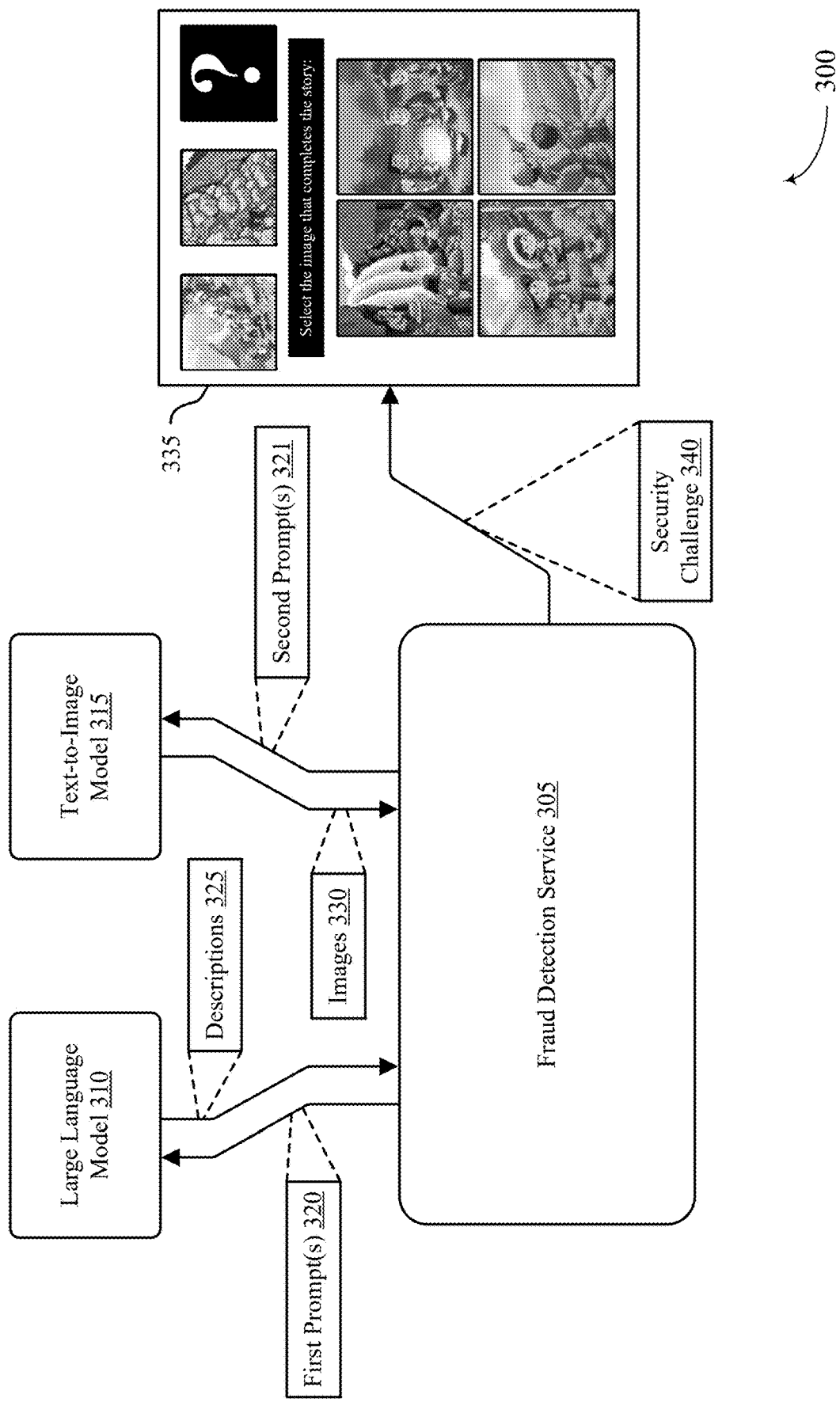
FIG. 3 shows an example of a block diagram that supports using contextual security challenges to prevent bot attacks in accordance with aspects of the present disclosure.

FIG. 3 shows an example of a block diagram 300 that supports using contextual security challenges to prevent bot attacks in accordance with aspects of the present disclosure. The block diagram 300 may implement aspects of the computing system 100 and the user interface 200 as illustrated by and described with reference to FIGS. 1 and 2. For example, the block diagram may include a fraud detection service 305, which may be associated with an identity management system illustrated by and described with reference to FIG. 1. The fraud detection service 305 may be an example of a security control system for Human Interaction Proof (HIP). Additionally, the block diagram 300 may include a user interface 335, which may be an example of a user interface illustrated by and described with reference to FIG. 2. In the example of FIG. 3, the user interface 335 may render or otherwise display a security challenge 340, which may be an example of a security challenge illustrated by and described with reference to FIG. 2. The block diagram 300 illustrates an architecture (e.g., framework) for generating security challenges that use contextual sequential image completion. That is, the security challenge 340 may be an example of a contextual sequential image completion challenge. For example, the block diagram 300 may provide for generating image descriptions (e.g., via a large language model 310, generating images (e.g., via text-to-image model 315), a backend (e.g., included in the fraud detection service 305), and a front-end (e.g., integration, which may include the user interface 335).

The fraud detection service 305 may obtain information indicative of multiple image descriptions (e.g., descriptions 325) from the large language model 310. Each image description may describe a respective image. In some examples, the obtained information may include or be otherwise indicative the descriptions 325, which may include a first set of image descriptions that corresponds to a sequence of events (e.g., a story) and a second set of image descriptions that is unassociated with the sequence of events (e.g., decoy images). The fraud detection service 305 may obtain the information from the large language model 310 based on one or more first prompts 320. In some examples, the one or more first prompts 320 may be examples of natural language messages (e.g., natural language sentences, natural language text). The descriptions 325 may include one or more respective descriptions of one or more story images and one or more decoy images, which may be generated using a single first prompt 320 or multiple first prompts 320. In some other examples, the descriptions 325 of the story images and the decoy images may be generated based on multiple first prompts 320. Additionally, or alternatively, the descriptions 325 of the story images and the decoy images may be generated based by iterating on the first prompt 320 and partitioning (e.g., separating) different parts of the first prompt 320 (e.g., a process requested by the prompt) into multiple (e.g., separate) tasks. In other words, the descriptions 325 of the story images and the decoy images may be generated using multiple first prompts 320 in which each first prompt 320 corresponds to a respective task performed by the large language model 310.

As an illustrative example, one of the first prompts 320 may indicate for the large language model to generate one or more three panel stories and output three sentences. In other words, a first prompt may include a first request for the large language model 310 to generate story image descriptions for the story images, where each story image description describes a respective event of the sequence of events. A second one of the first prompts 320 may indicate for the large language model to generate decoy descriptions and output 10-20 decoy image descriptions. That is, a second prompt may include a second request for the large language model 310 to generate decoy descriptions of the decoy images, where each decoy image description describes a respective event that is unassociated with the sequence of events. A third one of the first prompts 320 may indicate for the large language model to eliminate decoy image descriptions that makes sense (i.e., eliminate a decoy image description if the decoy image description and one or more story image descriptions makes sense). In other words, a third prompt may include a third request for the large language model 310 to eliminate a decoy image description based on the decoy image description being contextually relevant to a combination of at least two story image descriptions. A fourth one of the first prompts 320 may indicate for the large language model to eliminate decoy image descriptions that are relatively dissimilar to at least one of the story image descriptions. That is, a fourth prompt may include a fourth request for the large language model 310 to eliminate a decoy image description based on a respective difference between the decoy image description and one or more story image descriptions satisfying a threshold level of dissimilarity (e.g., or failing to satisfy a threshold level of similarity). Additionally, or alternatively, one or more prompts may include a request for the large language model 310 to add noise or distraction objects. For example, the large language model may add an object to one or more decoy images and one or more story images that may not be part of (or be contextually relevant to) the story. For example, a hat may be included in one or more of the decoy images and one or more of the story images, but may not pertain to the story formed by the story images.

In some examples, one or more of the first prompts 320 may include one or more rules associated with generation of the plurality of images. A rule may request that each story image and each decoy image be labeled (e.g., separately). For example, a rule may request that the story images be labeled with a respective number (e.g., 1, 2, 3) and decoy images be labeled with a respective letter (e.g., a, b, c). A rule may pertain to a quantity of events associated with each image description. That is, one or more of the first prompts 320 may include a request for three images that construct a story and for each image to complete one aspect of the story (e.g., an event). The one or more of the first prompts 320 may also include a request for three decoy images that are relatively similar to the story images. Additionally, or alternatively, a rule may pertain to objects included in the story image descriptions or the decoy image descriptions, or both. For example, one or more of the first prompts 320 may include a request for decoy images and story images to have one or more of the same objects.

Additionally, or alternatively, one or more of the first prompts 320 may include a rule pertaining to a structure of the descriptions 325. For example, one or more of the first prompts 320 may include examples of image descriptions to be output from the large language model 310 and may include one or more rules for the descriptions 325 (e.g., do not use "but not" in the descriptions 325). In some examples, a rule may request that titles not be included in the description 325. Additionally, or alternatively, a rule may request that the output be in a particular format, such as one or more JavaScript Object Notation (JSON) files. In some examples, a rule may request that the format of the descriptions 325 be consistent with (e.g., compatible with) an input format for the text-to-image model 315.

In some examples, one or more rules may correspond to one or more steps for generating a decoy image. For example, a rule may request that in a first step, the large language model 310 creates decoy images that have similar objects or background to one or more of the story images. A rule may request that in a second step, the large language model 310 determine whether two or more story images and a decoy image make contextual sense and, in a third step, remove the decoy image if the two or more story images and the decoy image make contextual sense. In some examples, a rule may indicate a topic seed. For example, a rule may request for the large language model 310 to generate one or more stories related to "Plants," in which the term "Plants" correspond to the topic seed. In some examples, one or more rules may request that one or more particular objects exist within multiple (e.g., all) images. Additionally, or alternatively, one or more rules may request to include decoy objects to multiple (e.g., some or all) images.

In response to the one or more first prompts 320, the fraud detection service 305 may obtain descriptions 325. The descriptions 325 may include multiple image descriptions each describing a respective image (e.g., a story image, a decoy image). The fraud detection service may use the text-to-image model 315 to generate images 330 based on the descriptions 325. For example, the fraud detection service may input second prompts 321 into the text-to-image model 315. The second prompts 321 may, in some examples, include natural language messages (e.g., natural language sentences, natural language text). The second prompts 321 may include or be otherwise based on the descriptions 325. For example, the second prompts may be the description 325 (e.g., the descriptions 325 may be input directed into the text-to-image model 315), the second prompts 321 may include the descriptions 325, or the second prompts 321 may include modified versions of the descriptions 325. For example, one or more of the second prompts 321 may include the descriptions 325 and a request for images to be created in with particular style, with a combination of styles, or with particular characteristics (e.g., one or more of the second prompts 321 may include "Children's Book Illustration" which may indicate for the text-to-image model to generate the images as children's book illustrations).

In response to the one or more second prompts 321, the fraud detection service 305 may obtain images 330, which may include a first image set that corresponds to the sequence of events (e.g., story images) and a second image set that is unassociated with the sequence of events (e.g., decoy images). The fraud detection service 305 may generate the security challenge 340 using the images 330. For example, the security challenge 340 may include a request for a user to identify the sequence of events from among the images included in the security challenge 340 (or from among a portion of the images included in the security challenge 340). For example, to generate the security challenge 340, the fraud detection service may generate a first subset of images including one or more story images and a second subset of images including at least one story image and one or more decoy images. In such an example, the request to identify the sequence of events may correspond to a request for the user to identify the story image from among the second subset of images based on the first subset of images. That is, identifying the story image in the second subset of images may identify the sequence of events (e.g., complete the story). In some examples, by using the large language model 310 and the text-to-image model 315, the fraud detection service 305 may generate sets (e.g., batches, groups) of images for multiple security challenges. In other words, the large language model 310 and the text-to-image model 315 may enable the fraud detection service 305 to generate security challenges that use contextual sequential image completion relatively easily and at a relatively low cost. In some examples, the fraud detection service 305 may generate security challenges in real-time. The fraud detection service 305 may provide security challenges to websites or applications (e.g., in batches or as a service).

In some examples, the fraud detection service 305 may generate security challenges with multiple (e.g., varying) levels of difficulty. Additionally, the fraud detection service 305 may include one or more test systems that attempt to solve security challenges, generated by the fraud detection service 305. The test systems may enable the fraud detection service 305 to determine a level of difficulty associated with one or more security challenges. For example, the fraud detection service 305 may use a test system to determine a level of difficulty associated with the security challenge 340. The fraud detection service 305 may remove (e.g., filter out) or otherwise modify the security challenge 340 based on the security challenge satisfying a first threshold associated with relatively easy security challenges. Additionally, or alternatively, the fraud detection service 305 may remove (e.g., filter out) or otherwise modify the security challenge 340 based on the security challenge satisfying a second threshold associated with relatively difficult security challenges. In some examples, the test system may attempt to solve the security challenge 340 by inputting the security challenge 340 into an image-to-text model and then inputting an output from the image-to-text model into the large language model 310. In some examples, however, an image description obtained from the image-to-text model for a story image (or a decoy image) included in the security challenge 340 may be relatively lengthy or inconsistent with a second prompt 321 used to generate the story image. Thus, it may be relatively difficult to solve the security challenge 340 based on the image description obtained from the image-to-text model. In other words, turning a sentence of text into a picture and then turning the picture back into the same sentence of text may be relatively difficult. As such, the security challenge 340 may provide for relatively robust prevention against bot attacks.

Figure 4:
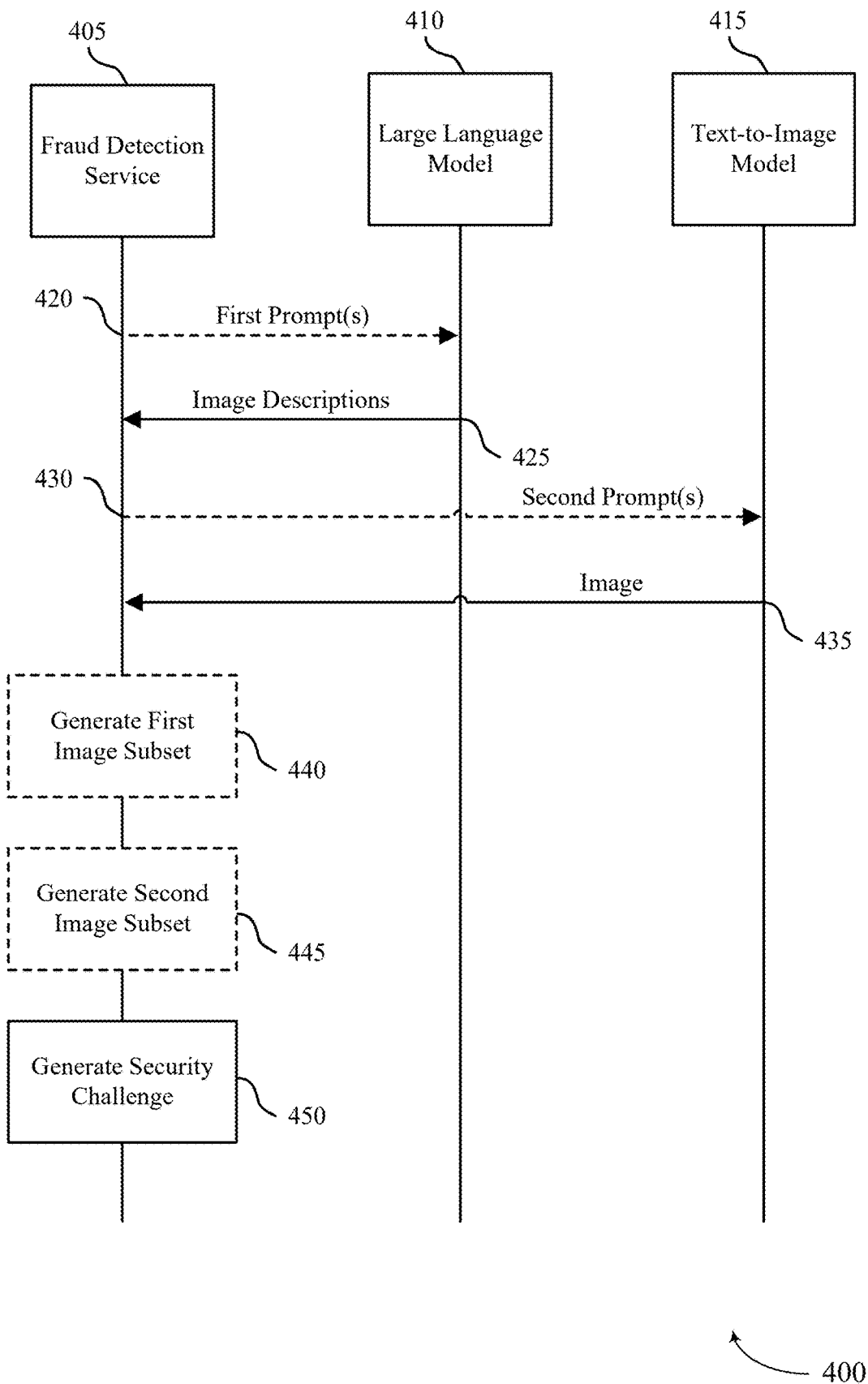
FIGS. 4 and 5 each show an example of a process flow that supports using contextual security challenges to prevent bot attacks in accordance with aspects of the present disclosure.

FIG. 4 shows an example of a process flow 400 that supports using contextual security challenges to prevent bot attacks in accordance with aspects of the present disclosure.

The process flow 400 may implement or be implemented by aspects of the computing system 100, the user interface 200, and the block diagram 300. For example, one or more aspects of the process flow 400 may be implemented at a fraud detection service 405, which may be an example of a fraud detection service illustrated by and described with reference to FIGS. 1 through 3. Additionally, one or more aspects of the process flow 400 may be implemented at a large language model 410 and a text-to-image model 415, which may be examples of the corresponding models illustrated by and described with reference to FIG. 3. In the following description of the process flow 400, the information communicated between the fraud detection service 405, the large language model 410, and the text-to-image model 415 may be performed in different orders or at different times than shown. Additionally, or alternatively, some operations may be omitted from the process flow 400 and other operations may be added to the process flow 400. In some examples, two or more operations may be combined in the process flow 400. The process flow 400 may provide for improved security, among other benefits.

The fraud detection service 405 may support contextual security challenges, which may be relatively difficult for bots to solve. For example, some security challenge solver (e.g., CAPTCHA® solver) attacks and fraud attacks are economic of scale attacks. As such, the fraud detection service 405 may generate contextual security challenges that are relatively difficult for bots to solve and are also as computationally expensive to solve.

In some examples, at 420, the fraud detection service 405 may output one or more first prompts to the large language model 410. The one or more first prompts may be examples of first prompts illustrated by and described with reference to FIG. 3. For example, each prompt may correspond to a respective task performed by the large language model 410. A first prompt of the one or more first prompts may include a first request for the large language model to generate a first image description set in which each image description of the first image description set describes a respective event of a sequence of events. In other words, the first image description set may include story image descriptions. A second prompt of the one or more first prompts may include a second request for the large language model to generate a second image description set in which each image description of the second image description set describes a respective event that is unassociated with the sequence of events. In other words, the second image description set may include decoy image descriptions.

At 425, the fraud detection service 405 may obtain information indicative of image descriptions from the large language model 410. The image descriptions may be examples of descriptions illustrated by and described with reference to FIG. 3. For example, each image description may describe a respective image (e.g., a story image, a decoy image). The obtained image descriptions may include the first image description set that corresponds to the sequence of events (e.g., the story image descriptions) and the second image description set that is unassociated with the sequence of events (e.g., the decoy image descriptions). The fraud detection service may obtain the information based on the one or more first prompts.

In some examples, at 430, the fraud detection service 405 may output one or more second prompts to the text-to-image model 415. The one or more second prompts may be examples of second prompts illustrated by and described with reference to FIG. 3. For example, the one or more second prompts may include or be otherwise based on the image descriptions obtained at 425. In some examples, each prompt of the one or more second prompts may correspond to a respective image description of the image descriptions obtained at 425.

At 435, the fraud detection service 405 may obtain images based on the image descriptions (e.g., based on the one or more second prompts that include or are otherwise indicative of the image descriptions). The images may be examples of images illustrated by and described with reference to FIGS. 2 and 3. For example, the images may include a first image set that corresponds to the sequence of events and are based on the first image description set (e.g., story images based on the story image descriptions). The images may also include a second image set that is unassociated with the sequence of events and is based on the second image description set (e.g., decoy images based on the decoy image descriptions).

In some examples, at 440, the fraud detection service 405 may generate a first subset of images. The first subset of images may be an example of a first image set 220 illustrated by and described with reference to FIG. 2. For example, the first subset of images may include one or more images of the first image set (e.g., one or more story images). In some examples, the first image set may include a first image corresponding to a first event of the sequence of events and a second image corresponding to a second event of the sequence of events. That is, the first image set may include a first story image and a second story image that form a portion of a story. In some examples, the first story image may correspond to a first event of the sequence of events and the second story image may correspond to a second event of the sequence of events.

In such examples, at 445, the fraud detection service 405 may generate a second subset of images. The second subset of images may be an example of a second image set 221 illustrated by and described with reference to FIG. 2. For example, the second subset of images may include an image of the first image set (e.g., a story image) and one or more images of the second image set (e.g., one or more decoy images). The image of the first image set may correspond to a third event of the sequence of events (e.g., may be a target story image that completes the story).

At 450, the fraud detection service 405 may generate a security challenge using the images. The security challenge may be an example of a security challenge illustrated by and described with reference to FIGS. 2 and 3. For example, the security challenge may include the first subset of images, the second subset of images, and a request for a user to identify the sequence of events from among the first subset of images and the second subset of images. Identification of the sequence of events may be based on each image of the first image set (e.g., each story image) being contextually relevant to the sequence of events. For example, to identify the sequence of events, the user may identify the target story image from among the second subset of images based on the first subset of images. That is, the user may use context to determine that the target story image corresponds to a third event of the sequence of events and thus completes the story that is partially formed by the first subset of images.

Figure 5:
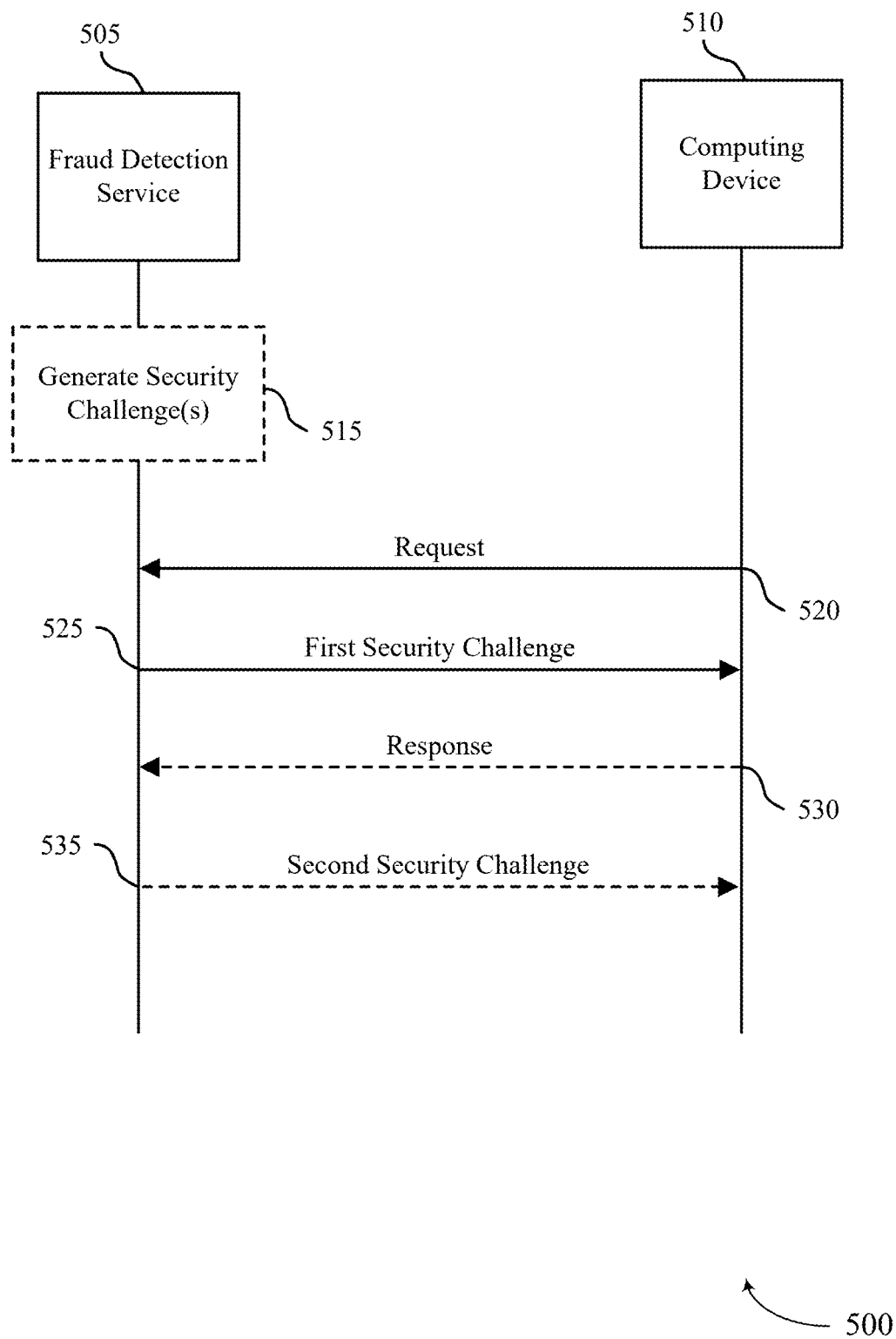

FIG. 5 shows an example of a process flow 500 that supports using contextual security challenges to prevent bot attacks in accordance with aspects of the present disclosure. The process flow 500 may implement or be implemented by aspects of the computing system 100, the user interface 200, the block diagram 300, and the process flow 400. For example, one or more aspects of the process flow 500 may be implemented at a fraud detection service 505, which may be an example of a fraud detection service illustrated by and described with reference to FIGS. 1 through 4. Additionally, one or more aspects of the process flow 500 may be implemented at a computing device 510, which may be examples of a computing device illustrated by and described with reference to FIG. 1. In the following description of the process flow 500, the information communicated between the fraud detection service 505 and the computing device 510 may be performed in different orders or at different times than shown. Additionally, or alternatively, some operations may be omitted from the process flow 500 and other operations may be added to the process flow 500. In some examples, two or more operations may be combined in the process flow 500. The process flow 500 may provide for improved security, among other benefits.

In some examples, at 515, the fraud detection service 505 may generate one or more security challenges. The one or more security challenges may be examples of security challenges illustrated by and described with reference to FIGS. 2 through 4. For example, each security challenge may be an example of a contextual security challenge that is relatively difficult for bots to solve and is also computationally expensive to solve.

At 520, the fraud detection service 505 may obtain information indicative of a first request from the computing device 510. The computing device 510 may be associated with a client of the fraud detection service 505.

At 525, in response to the first request, the fraud detection service 505 may output a first security challenge of the one or more security challenges generated at 515. The security challenge may include a second request for a user of the computing device 510 to identify a sequence of events from multiple images. The multiple images may include a first image set that corresponds to the sequence of events (e.g., story images) and a second image set that is unassociated with the sequence of events (e.g., decoy images).

In some examples, at 530, the fraud detection service 505 may obtain a response to the security challenge from the computing device 510. The response may be indicative of a second sequence of events (e.g., may include an attempt to solve the security challenge, such as a selection of an image from among the multiple images included in the security challenge).

In some examples, at 535, the fraud detection service 505 may output a second security challenge of the one or more security challenges to the computing device 510. The second security challenge may include a third request for the user of the computing device 510 to identify a third sequence of events from among the multiple images. In some examples, the fraud detection service may output the second security challenge based on the response obtained at 530 being incorrect (e.g., based on the second sequence of events being different from the sequence of events). For example, the fraud detection service 505 may determine that the response corresponds to a failed attempt to solve the first security challenge based on the second sequence of events being different from the sequence of events.

The fraud detection service 505 may, in some examples, exclude the first security challenge from a set of security challenges (e.g., stored at the fraud detection service for future use) based on the failed attempt. For example, the fraud detection service 505 may exclude the first security challenge from the set of security challenges based on determining that a rate of failed attempts to solve the first security challenge satisfies a threshold. In other words, the fraud detection service 505 may determine that the first security challenge is relatively difficult for humans to solve and, as such, may remove the first security challenge from the set of security challenges. Additionally, or alternatively, the fraud detection service may output the second security challenge as an increased security measure. That is, the fraud detection service 505 may output the second security challenge irrespective of whether the response to the first security challenge is correct. In some examples, the first security challenge or the second security challenge, or both, may lead to increased security for the fraud detection service 505, among other benefits.

Figure 6:
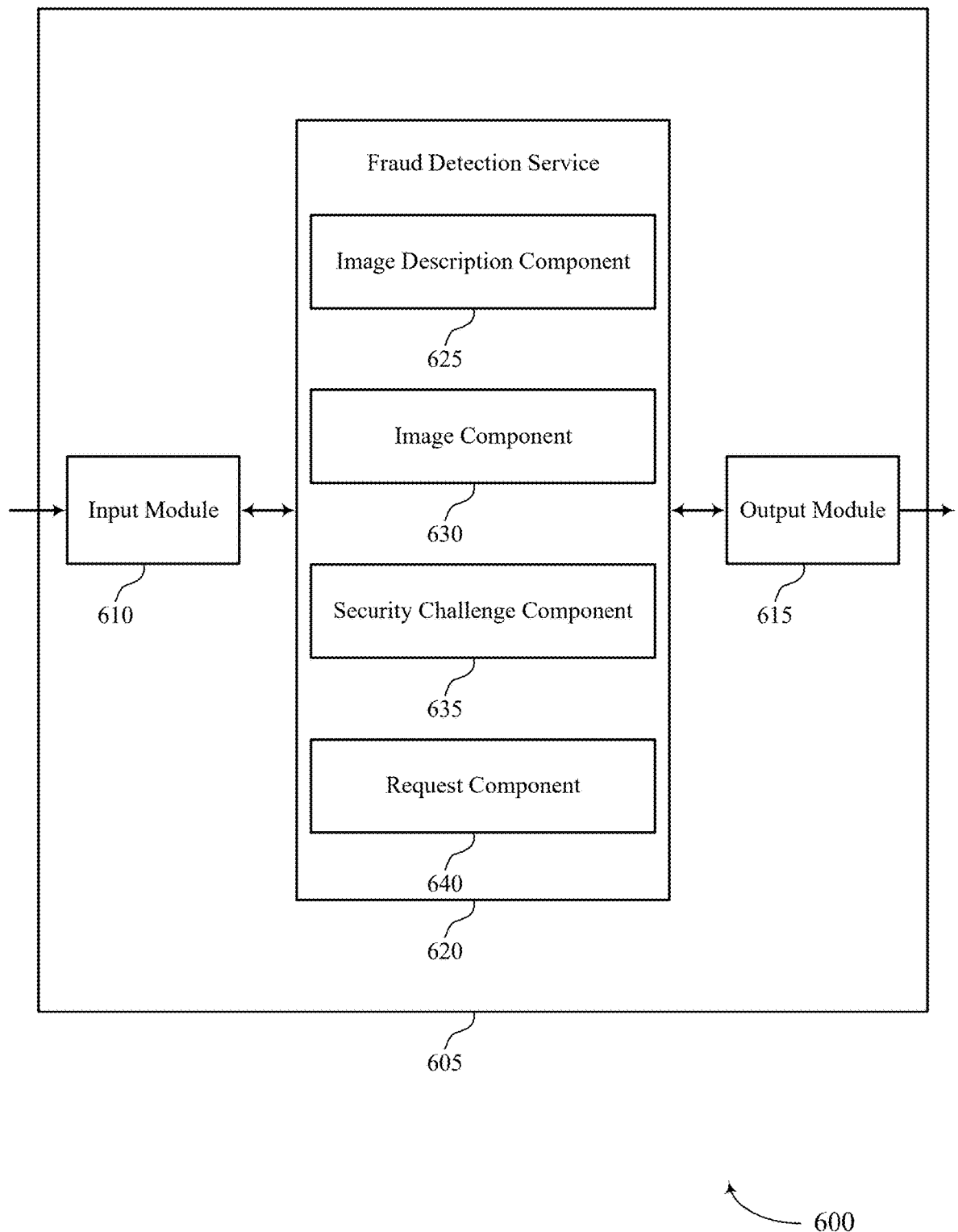
FIG. 6 shows a block diagram of an apparatus that supports using contextual security challenges to prevent bot attacks in accordance with aspects of the present disclosure.

FIG. 6 shows a block diagram 600 of a device 605 that supports using contextual security challenges to prevent bot attacks in accordance with aspects of the present disclosure. The device 605 may include an input module 610, an output module 615, and a fraud detection service 620. The device 605, or one of more components of the device 605 (e.g., the input module 610, the output module 615, and the fraud detection service 620), may include at least one processor, which may be coupled with at least one memory, to support the described techniques. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the fraud detection service 620 to support using contextual security challenges to prevent bot attacks. In some cases, the input module 610 may be a component of an input/output (I/O) controller 810 as described with reference to FIG. 8.

The output module 615 may manage output signals for the device 605. For example, the output module 615 may receive signals from other components of the device 605, such as the fraud detection service 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the fraud detection service 620 may include an image description component 625, an image component 630, a security challenge component 635, a request component 640, or any combination thereof. In some examples, the fraud detection service 620, or various components thereof, may be configured to perform various operations (e.g., receiving, monitoring, transmitting) using or otherwise in cooperation with the input module 610, the output module 615, or both. For example, the fraud detection service 620 may receive information from the input module 610, send information to the output module 615, or be integrated in combination with the input module 610, the output module 615, or both to receive information, transmit information, or perform various other operations as described herein.

The fraud detection service 620 may support generating security challenges in accordance with examples as disclosed herein. The image description component 625 may be configured to support obtaining information indicative of a set of multiple image descriptions, each image description of the set of multiple image descriptions describing a respective image of a set of multiple images, where the set of multiple image descriptions includes a first image description set that corresponds to a sequence of events and a second image description set that is unassociated with the sequence of events. The image component 630 may be configured to support obtaining the set of multiple images based on the information, where the set of multiple images includes a first image set that corresponds to the sequence of events based on the first image description set, and a second image set that is unassociated with the sequence of events based on the second image description set. The security challenge component 635 may be configured to support generating a security challenge using the set of multiple images, where the security challenge includes a request for a user to identify the sequence of events from among the set of multiple images, and where identification of the sequence of events is based on each image of the first image set being contextually relevant to the sequence of events.

Additionally, or alternatively, the fraud detection service 620 may support fraud detection in accordance with examples as disclosed herein. The request component 640 may be configured to support obtaining information indicative of a first request from a device associated with a client of the fraud detection service. The security challenge component 635 may be configured to support outputting a security challenge to the device in response to the first request, the security challenge including a second request for a user of the device to identify a sequence of events from among a set of multiple images, where the set of multiple images includes a first image set that corresponds to the sequence of events and a second image set that is unassociated with the sequence of events.

Figure 7:
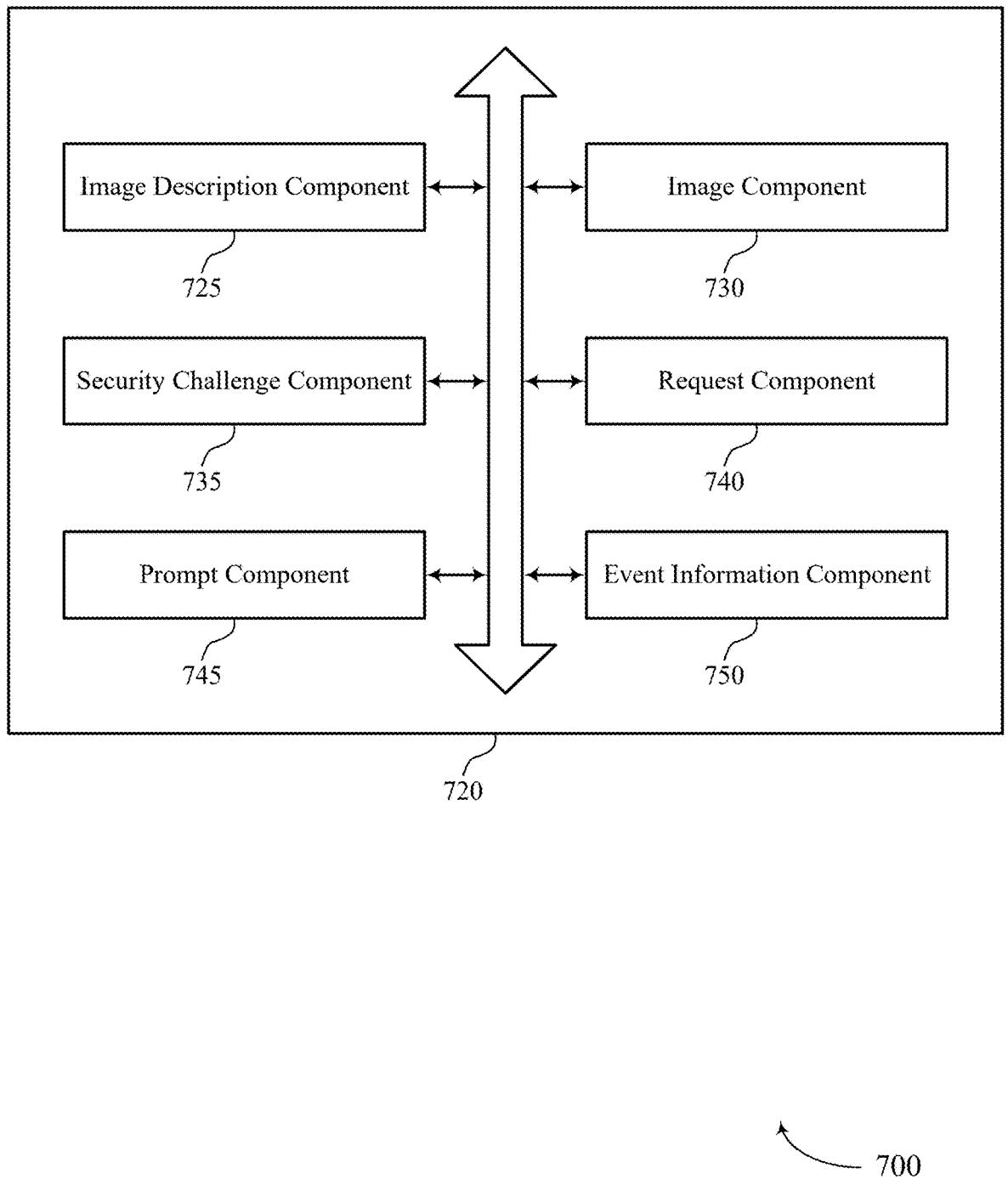
FIG. 7 shows a block diagram of a fraud detection service that supports using contextual security challenges to prevent bot attacks in accordance with aspects of the present disclosure.

FIG. 7 shows a block diagram 700 of a fraud detection service 720 that supports using contextual security challenges to prevent bot attacks in accordance with aspects of the present disclosure. The fraud detection service 720 may be an example of aspects of a fraud detection service or a fraud detection service 620, or both, as described herein. The fraud detection service 720, or various components thereof, may be an example of means for performing various aspects of using contextual security challenges to prevent bot attacks as described herein. For example, the fraud detection service 720 may include an image description component 725, an image component 730, a security challenge component 735, a request component 740, a prompt component 745, an event information component 750, or any combination thereof. Each of these components, or components of subcomponents thereof (e.g., one or more processors, one or more memories), may communicate, directly or indirectly, with one another (e.g., via one or more buses).

The fraud detection service 720 may support generating security challenges in accordance with examples as disclosed herein. The image description component 725 may be configured to support obtaining information indicative of a set of multiple image descriptions, each image description of the set of multiple image descriptions describing a respective image of a set of multiple images, where the set of multiple image descriptions includes a first image description set that corresponds to a sequence of events and a second image description set that is unassociated with the sequence of events. The image component 730 may be configured to support obtaining the set of multiple images based on the information, where the set of multiple images includes a first image set that corresponds to the sequence of events based on the first image description set, and a second image set that is unassociated with the sequence of events based on the second image description set. The security challenge component 735 may be configured to support generating a security challenge using the set of multiple images, where the security challenge includes a request for a user to identify the sequence of events from among the set of multiple images, and where identification of the sequence of events is based on each image of the first image set being contextually relevant to the sequence of events.

In some examples, to support generating the security challenge, the image component 730 may be configured to support generating a first subset of images including one or more images of the first image set. In some examples, to support generating the security challenge, the image component 730 may be configured to support generating a second subset of images including an image of the first image set and one or more images of the second image set, where the request to identify the sequence of events includes a first request for the user to identify the image from among the second subset of images based on the first subset of images, and where identifying the image identifies the sequence of events.

In some examples, the one or more images of the first image set include a first image corresponding to a first event of the sequence of events and a second image corresponding to a second event of the sequence of events. In some examples, identification of the image from among the second subset of images is based on the image corresponding to a third event of the sequence of events. In some examples, the third event includes a last event of the sequence of events.

In some examples, to support obtaining the information, the prompt component 745 may be configured to support obtaining the information using a first machine learning model, where the information is based on one or more prompts, and where each prompt corresponds to a respective task performed by the first machine learning model.

In some examples, a first prompt of the one or more prompts includes a first request for the first machine learning model to generate the first image description set, each image description of the first image description set describing a respective event of the sequence of events. In some examples, a second prompt of the one or more prompts includes a second request for the first machine learning model to generate the second image description set, each image description of the second image description set describing a respective event that is unassociated with the sequence of events.

In some examples, a third prompt of the one or more prompts includes a third request for the first machine learning model to eliminate an image description from the second image description set based on the image description being contextually relevant to a combination of at least two image descriptions of the first image description set.

In some examples, a fourth prompt of the one or more prompts includes a fourth request for the first machine learning model to eliminate an image description from the second image description set based on a respective difference between the image description and one or more image descriptions of the first image description set satisfying a threshold.

In some examples, a fifth prompt of the one or more prompts includes a fifth request for the first machine learning model to add noise, or an object, or both, to at least one image description of the set of multiple image descriptions.

In some examples, the one or more prompts indicate one or more rules associated with generation of the set of multiple images.

In some examples, the one or more rules include a rule pertaining to a quantity of events associated with each image description, a rule pertaining to objects included in the first image description set, a rule pertaining to objects included in the second image description set, a rule pertaining to objects included in each image of the set of multiple images, a rule pertaining to a structure of the set of multiple image descriptions, or a rule pertaining to decoy objects included in at least a portion of the set of multiple images, or any combination thereof.

In some examples, the one or more prompts include a first example of the first image description set, or a second example of the second image description set, or both. In some examples, the first machine learning model includes a large language model.

In some examples, to support obtaining the set of multiple images, the image component 730 may be configured to support obtaining the set of multiple images using a second machine learning model, where the set of multiple images is based on a set of multiple prompts, and where each prompt of the set of multiple prompts corresponds to a respective image description of the set of multiple image descriptions.

In some examples, obtaining each prompt of the set of multiple prompts includes a natural language description and the second machine learning model includes a text-to-image model. In some examples, the prompt component 745 may be configured to support obtaining the set of multiple prompts based on modifying the set of multiple image descriptions in accordance with the second machine learning model.

In some examples, the event information component 750 may be configured to support obtaining second information indicative of a second sequence of events based on the set of multiple images, where the second information is obtained using one or more machine learning models. In some examples, the security challenge component 735 may be configured to support outputting the security challenge to a device associated with a client of the fraud detection service based on the second sequence of events being different from the sequence of events.

In some examples, the set of multiple image descriptions is associated with a topic. In some examples, the topic includes a category of objects. In some examples, each image of the set of multiple images includes one or more objects corresponding to the category of objects.

Additionally, or alternatively, the fraud detection service 720 may support fraud detection in accordance with examples as disclosed herein. The request component 740 may be configured to support obtaining information indicative of a first request from a device associated with a client of the fraud detection service. In some examples, the security challenge component 735 may be configured to support outputting a security challenge to the device in response to the first request, the security challenge including a second request for a user of the device to identify a sequence of events from among a set of multiple images, where the set of multiple images includes a first image set that corresponds to the sequence of events and a second image set that is unassociated with the sequence of events.

In some examples, the second request for the user to identify the sequence of events includes a request for the user to identify an image of the first image set based on a first subset of images, identification of the image is from among a second subset of images and identifies the sequence of events. In some examples, the first subset of images includes one or more images of the first image set and the second subset of images includes the image and one or more images of the second image set.

In some examples, the one or more images of the first image set include a first image corresponding to a first event of the sequence of events and a second image corresponding to a second event of the sequence of events. In some examples, the identification of the image from among the second subset of images is based on the image corresponding to a third event of the sequence of events.

In some examples, the security challenge component 735 may be configured to support outputting a second security challenge, where the second security challenge includes a third request for the user of the device to identify a third sequence of events from among a second set of multiple images.

In some examples, the event information component 750 may be configured to support obtaining, from the device in response to the security challenge, second information indicative of a second sequence of events, where outputting the second security challenge is based on the second sequence of events being the same as the sequence of events.

In some examples, the event information component 750 may be configured to support obtaining, from the device in response to the security challenge, second information indicative of a second sequence of events, where outputting the second security challenge is based on the second sequence of events being different from the sequence of events.

In some examples, the security challenge component 735 may be configured to support determining that the second information corresponds to a failed attempt to solve the security challenge based on the second sequence of events being different from the sequence of events. In some examples, the security challenge component 735 may be configured to support excluding the security challenge from a set of security challenges based on the failed attempt.

In some examples, to support excluding the security challenge from the set of security challenges, the security challenge component 735 may be configured to support excluding the security challenge from the set of security challenges based on determining that a rate of failed attempts to solve the security challenge satisfies a threshold.

Figure 8:
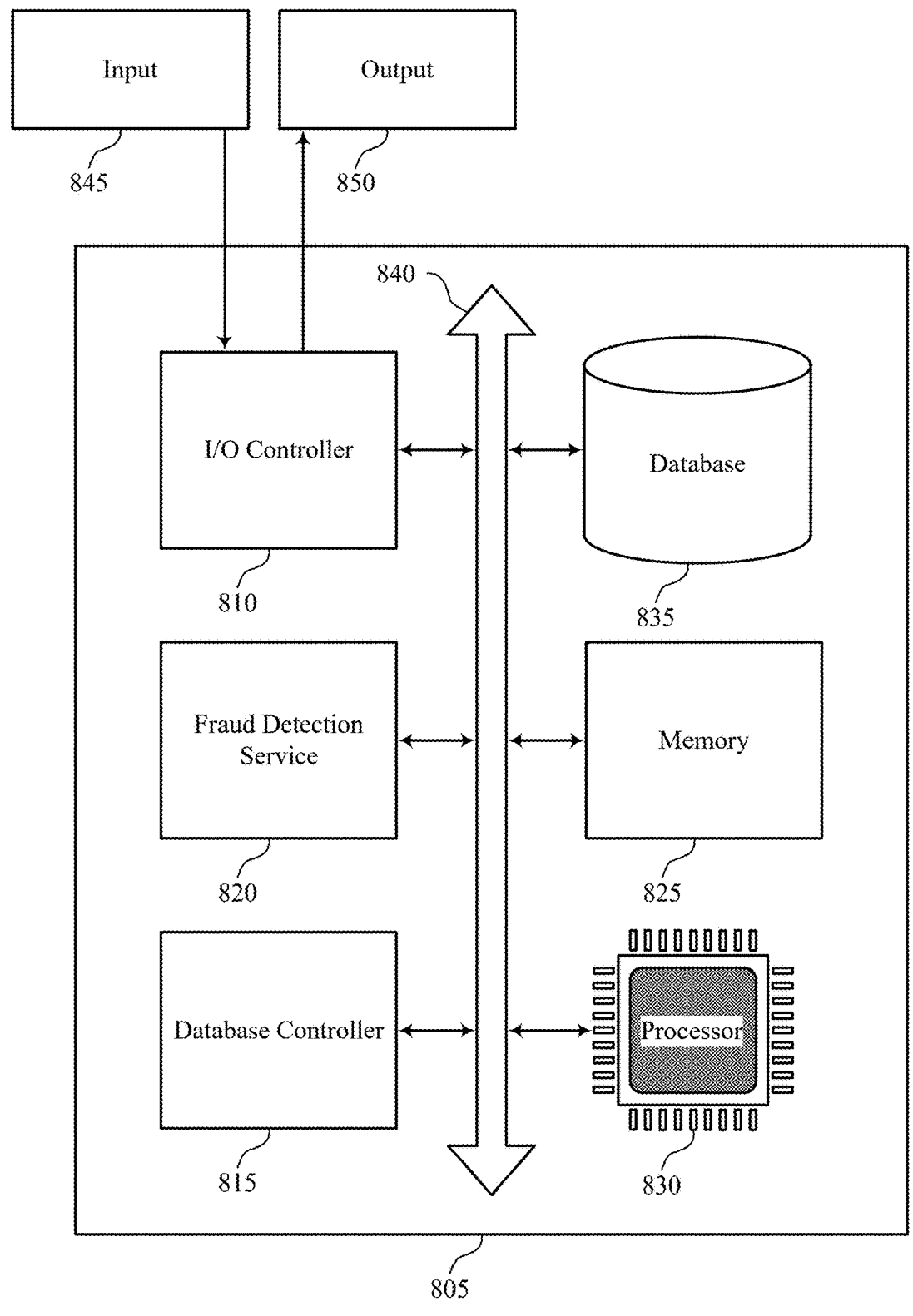
FIG. 8 shows a diagram of a system including a device that supports using contextual security challenges to prevent bot attacks in accordance with aspects of the present disclosure.

FIG. 8 shows a diagram of a system 800 including a device 805 that supports using contextual security challenges to prevent bot attacks in accordance with aspects of the present disclosure. The device 805 may be an example of or include the components of a device 605 as described herein. The device 805 may include components for bi-directional voice and data communications including components for transmitting and receiving communications, such as a fraud detection service 820, an I/O controller 810, a database controller 815, at least one memory 825, at least one processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause at least one processor 830 to perform various functions described herein. In some cases, the memory 825 may contain, among other things, a basic I/O system (BIOS) which may control basic hardware or software operation such as the interaction with peripheral components or devices. The memory 825 may be an example of a single memory or multiple memories. For example, the device 805 may include one or more memories 825.

The processor 830 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in at least one memory 825 to perform various functions (e.g., functions or tasks supporting contextual security challenges to prevent bot attacks). The processor 830 may be an example of a single processor or multiple processors. For example, the device 805 may include one or more processors 830.

The fraud detection service 820 may support generating security challenges in accordance with examples as disclosed herein. For example, the fraud detection service 820 may be configured to support obtaining information indicative of a set of multiple image descriptions, each image description of the set of multiple image descriptions describing a respective image of a set of multiple images, where the set of multiple image descriptions includes a first image description set that corresponds to a sequence of events and a second image description set that is unassociated with the sequence of events. The fraud detection service 820 may be configured to support obtaining the set of multiple images based on the information, where the set of multiple images includes a first image set that corresponds to the sequence of events based on the first image description set, and a second image set that is unassociated with the sequence of events based on the second image description set. The fraud detection service 820 may be configured to support generating a security challenge using the set of multiple images, where the security challenge includes a request for a user to identify the sequence of events from among the set of multiple images, and where identification of the sequence of events is based on each image of the first image set being contextually relevant to the sequence of events.

Additionally, or alternatively, the fraud detection service 820 may support fraud detection in accordance with examples as disclosed herein. For example, the fraud detection service 820 may be configured to support obtaining information indicative of a first request from a device associated with a client of the fraud detection service. The fraud detection service 820 may be configured to support outputting a security challenge to the device in response to the first request, the security challenge including a second request for a user of the device to identify a sequence of events from among a set of multiple images, where the set of multiple images includes a first image set that corresponds to the sequence of events and a second image set that is unassociated with the sequence of events.

By including or configuring the fraud detection service 820 in accordance with examples as described herein, the device 805 may support techniques for improved user experience related to reduced processing and increased security.

Figure 9:
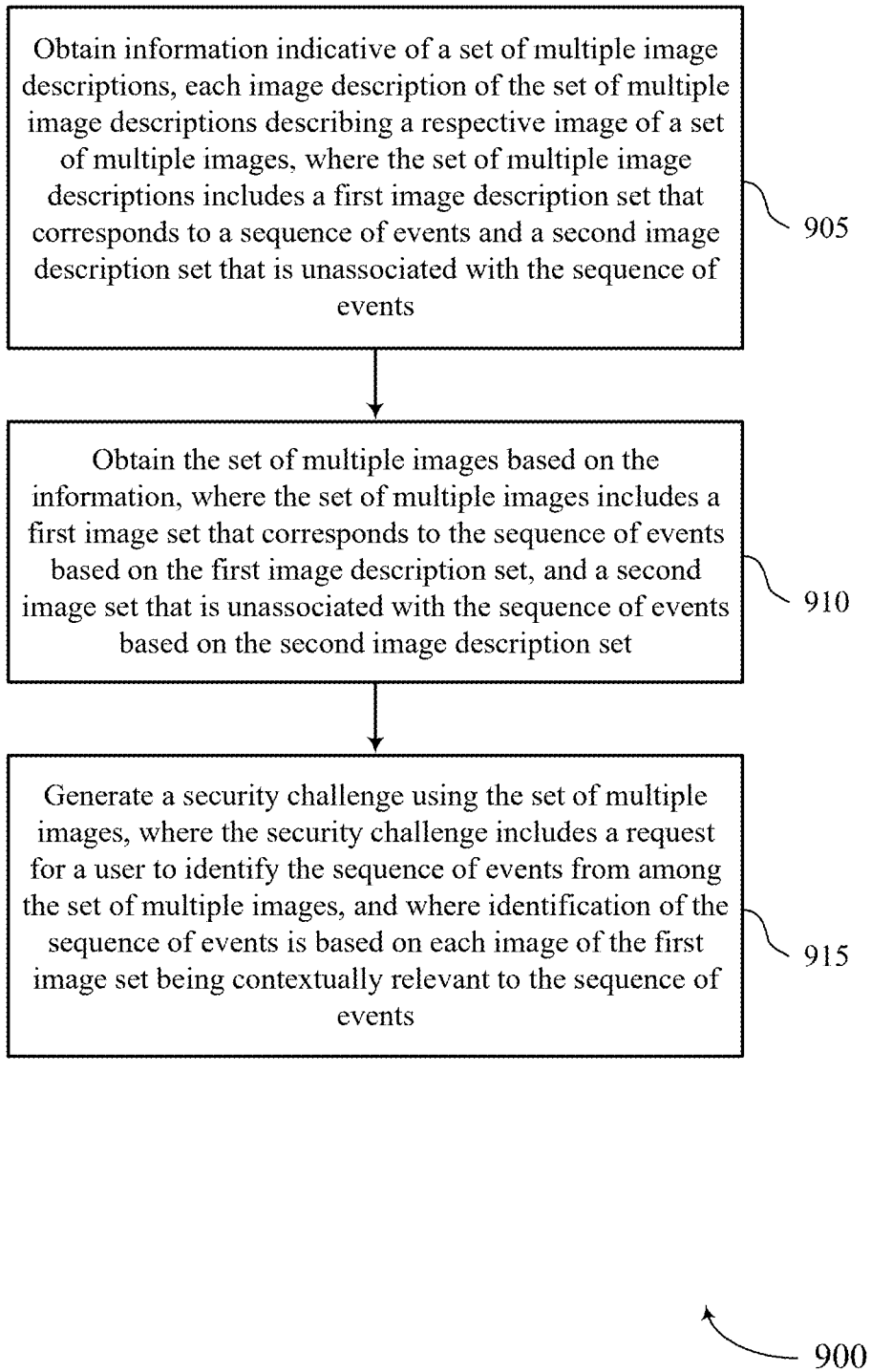
FIGS. 9 and 10 show flowcharts illustrating computer-implemented methods that support using contextual security challenges to prevent bot attacks in accordance with aspects of the present disclosure.

FIG. 9 shows a flowchart illustrating a computer-implemented method 900 that supports using contextual security challenges to prevent bot attacks in accordance with aspects of the present disclosure. The operations of the computer-implemented method 900 may be implemented by a computer (e.g., an Okta Device) or its components as described herein. For example, the operations of the computer-implemented method 900 may be performed by an Okta Device as described with reference to FIGS. 1 through 8. In some examples, an Okta Device may execute a set of instructions to control the functional elements of the Okta Device to perform the described functions. Additionally, or alternatively, the Okta Device may perform aspects of the described functions using special-purpose hardware.

At 905, the computer-implemented method may include obtaining information indicative of a set of multiple image descriptions, each image description of the set of multiple image descriptions describing a respective image of a set of multiple images, where the set of multiple image descriptions includes a first image description set that corresponds to a sequence of events and a second image description set that is unassociated with the sequence of events. The operations of block 905 may be performed in accordance with examples as disclosed herein. In some examples, aspects of the operations of 905 may be performed by an image description component 725 as described with reference to FIG. 7.

At 910, the computer-implemented method may include obtaining the set of multiple images based on the information, where the set of multiple images includes a first image set that corresponds to the sequence of events based on the first image description set, and a second image set that is unassociated with the sequence of events based on the second image description set. The operations of block 910 may be performed in accordance with examples as disclosed herein. In some examples, aspects of the operations of 910 may be performed by an image component 730 as described with reference to FIG. 7.

At 915, the computer-implemented method may include generating a security challenge using the set of multiple images, where the security challenge includes a request for a user to identify the sequence of events from among the set of multiple images, and where identification of the sequence of events is based on each image of the first image set being contextually relevant to the sequence of events. The operations of block 915 may be performed in accordance with examples as disclosed herein. In some examples, aspects of the operations of 915 may be performed by a security challenge component 735 as described with reference to FIG. 7.

Figure 10:
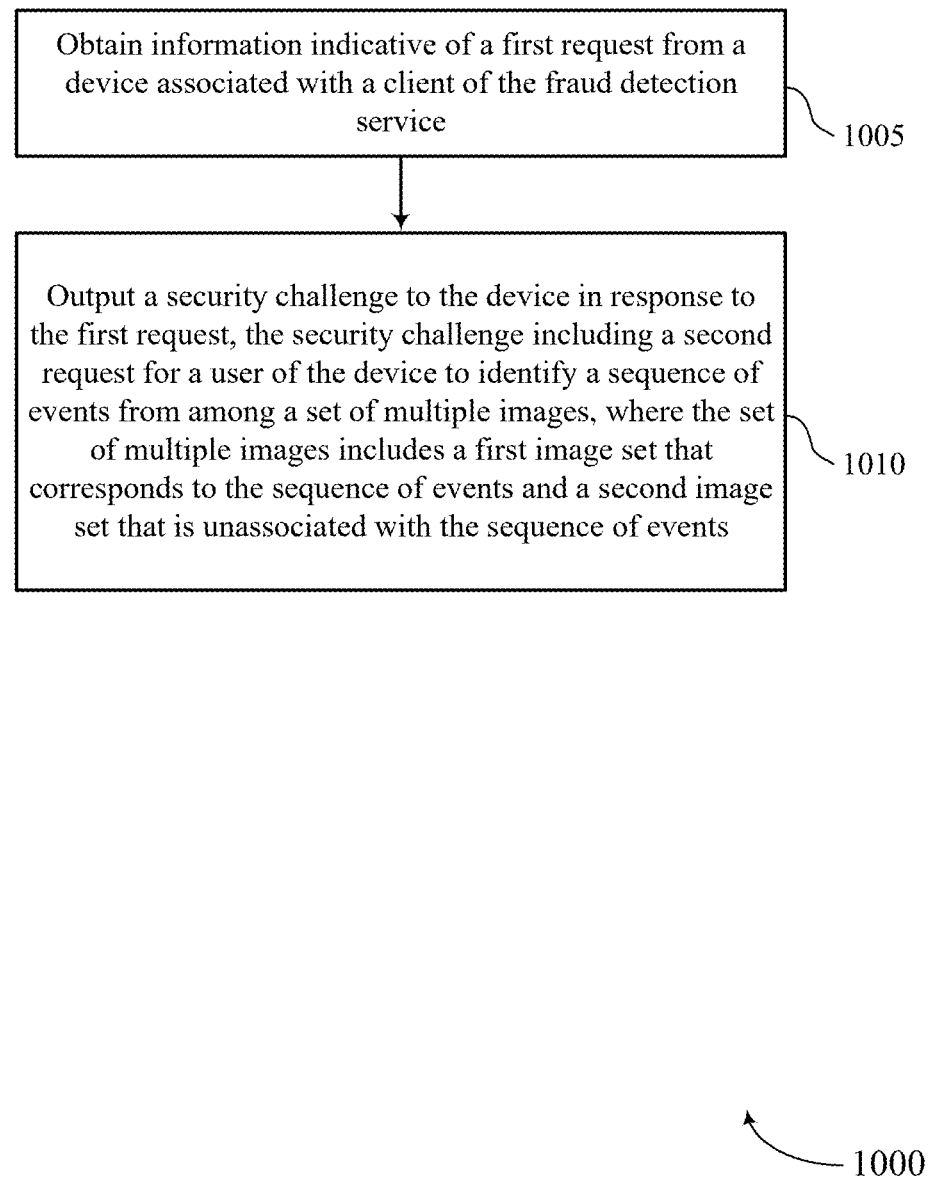

FIG. 10 shows a flowchart illustrating a computer-implemented method 1000 that supports using contextual security challenges to prevent bot attacks in accordance with aspects of the present disclosure. The operations of the computer-implemented method 1000 may be implemented by a computer (e.g., an Okta Device) or its components as described herein. For example, the operations of the computer-implemented method 1000 may be performed by an Okta Device as described with reference to FIGS. 1 through 8. In some examples, an Okta Device may execute a set of instructions to control the functional elements of the Okta Device to perform the described functions. Additionally, or alternatively, the Okta Device may perform aspects of the described functions using special-purpose hardware.

At 1005, the computer-implemented method may include obtaining information indicative of a first request from a device associated with a client of the fraud detection service. The operations of block 1005 may be performed in accordance with examples as disclosed herein. In some examples, aspects of the operations of 1005 may be performed by a request component 740 as described with reference to FIG. 7.

At 1010, the computer-implemented method may include outputting a security challenge to the device in response to the first request, the security challenge including a second request for a user of the device to identify a sequence of events from among a set of multiple images, where the set of multiple images includes a first image set that corresponds to the sequence of events and a second image set that is unassociated with the sequence of events. The operations of block 1010 may be performed in accordance with examples as disclosed herein. In some examples, aspects of the operations of 1010 may be performed by a security challenge component 735 as described with reference to FIG. 7.

The following provides an overview of aspects of the present disclosure:

Aspect 1: A computer-implemented method at a fraud detection service, comprising: obtaining information indicative of a plurality of image descriptions, each image description of the plurality of image descriptions describing a respective image of a plurality of images, wherein the plurality of image descriptions comprises a first image description set that corresponds to a sequence of events and a second image description set that is unassociated with the sequence of events; obtaining the plurality of images based at least in part on the information, wherein the plurality of images comprises a first image set that corresponds to the sequence of events based at least in part on the first image description set, and a second image set that is unassociated with the sequence of events based at least in part on the second image description set; and generating a security challenge using the plurality of images, wherein the security challenge comprises a request for a user to identify the sequence of events from among the plurality of images, and wherein identification of the sequence of events is based at least in part on each image of the first image set being contextually relevant to the sequence of events.

Aspect 2: The computer-implemented method of aspect 1, wherein generating the security challenge comprises: generating a first subset of images comprising one or more images of the first image set; and generating a second subset of images comprising an image of the first image set and one or more images of the second image set, wherein the request to identify the sequence of events comprises a first request for the user to identify the image from among the second subset of images based at least in part on the first subset of images, and wherein identifying the image identifies the sequence of events.

Aspect 3: The computer-implemented method of aspect 2, wherein the one or more images of the first image set comprise a first image corresponding to a first event of the sequence of events and a second images corresponding to a second event of the sequence of events, and identification of the image from among the second subset of images is based at least in part on the image corresponding to a third event of the sequence of events.

Aspect 4: The computer-implemented method of aspect 3, wherein the third event comprises a last event of the sequence of events.

Aspect 5: The computer-implemented method of any of aspects 1 through 4, wherein obtaining the information comprises: obtaining the information using a first machine learning model, wherein the information is based at least in part on one or more prompts, and wherein each prompt corresponds to a respective task performed by the first machine learning model.

Aspect 6: The computer-implemented method of aspect 5, wherein a first prompt of the one or more prompts comprises a first request for the first machine learning model to generate the first image description set, each image description of the first image description set describing a respective event of the sequence of events, and a second prompt of the one or more prompts comprises a second request for the first machine learning model to generate the second image description set, each image description of the second image description set describing a respective event that is unassociated with the sequence of events.

Aspect 7: The computer-implemented method of aspect 6, wherein a third prompt of the one or more prompts comprises a third request for the first machine learning model to eliminate an image description from the second image description set based at least in part on the image description being contextually relevant to a combination of at least two image descriptions of the first image description set.

Aspect 8: The computer-implemented method of any of aspects 6 through 7, wherein a fourth prompt of the one or more prompts comprises a fourth request for the first machine learning model to eliminate an image description from the second image description set based at least in part on a respective difference between the image description and one or more image descriptions of the first image description set satisfying a threshold.

Aspect 9: The computer-implemented method of any of aspects 6 through 8, wherein a fifth prompt of the one or more prompts comprises a fifth request for the first machine learning model to add noise, or an object, or both, to at least one image description of the plurality of image descriptions.

Aspect 10: The computer-implemented method of any of aspects 5 through 9, wherein the one or more prompts indicate one or more rules associated with generation of the plurality of images.

Aspect 11: The computer-implemented method of aspect 10, wherein the one or more rules comprise a rule pertaining to a quantity of events associated with each image description, a rule pertaining to objects included in the first image description set, a rule pertaining to objects included in the second image description set, a rule pertaining to objects included in each image of the plurality of images, a rule pertaining to a structure of the plurality of image descriptions, or a rule pertaining to decoy objects included in at least a portion of the plurality of images, or any combination thereof.

Aspect 12: The computer-implemented method of any of aspects 5 through 11, wherein the one or more prompts comprise a first example of the first image description set, or a second example of the second image description set, or both.

Aspect 13: The computer-implemented method of any of aspects 5 through 12, wherein the first machine learning model comprises a large language model.

Aspect 14: The computer-implemented method of any of aspects 1 through 13, wherein obtaining the plurality of images comprises: obtaining the plurality of images using a second machine learning model, wherein the plurality of images is based at least in part on a plurality of prompts, and wherein each prompt of the plurality of prompts corresponds to a respective image description of the plurality of image descriptions.

Aspect 15: The computer-implemented method of aspect 14, wherein obtaining each prompt of the plurality of prompts comprises a natural language description and the second machine learning model comprises a text-to-image model.

Aspect 16: The computer-implemented method of any of aspects 14 through 15, further comprising: obtaining the plurality of prompts based at least in part on modifying the plurality of image descriptions in accordance with the second machine learning model.

Aspect 17: The computer-implemented method of any of aspects 1 through 16, further comprising: obtaining second information indicative of a second sequence of events based at least in part on the plurality of images, wherein the second information is obtained using one or more machine learning models; and outputting the security challenge to a device associated with a client of the fraud detection service based at least in part on the second sequence of events being different from the sequence of events.

Aspect 18: The computer-implemented method of any of aspects 1 through 17, wherein the plurality of image descriptions is associated with a topic, and the topic comprises a category of objects, and each image of the plurality of images comprises one or more objects corresponding to the category of objects.

Aspect 19: A computer-implemented method at a fraud detection service, comprising: obtaining information indicative of a first request from a device associated with a client of the fraud detection service; and outputting a security challenge to the device in response to the first request, the security challenge comprising a second request for a user of the device to identify a sequence of events from among a plurality of images, wherein the plurality of images comprises a first image set that corresponds to the sequence of events and a second image set that is unassociated with the sequence of events.

Aspect 20: The computer-implemented method of aspect 19, wherein the second request for the user to identify the sequence of events comprises a request for the user to identify an image of the first image set based at least in part on a first subset of images, identification of the image is from among a second subset of images and identifies the sequence of events, and the first subset of images comprises one or more images of the first image set and the second subset of images comprises the image and one or more images of the second image set.

Aspect 21: The computer-implemented method of aspect 20, wherein the one or more images of the first image set comprise a first image corresponding to a first event of the sequence of events and a second images corresponding to a second event of the sequence of events, and the identification of the image from among the second subset of images is based at least in part on the image corresponding to a third event of the sequence of events.

Aspect 22: The computer-implemented method of any of aspects 19 through 21, further comprising: outputting a second security challenge, wherein the second security challenge comprises a third request for the user of the device to identify a third sequence of events from among a second plurality of images.

Aspect 23: The computer-implemented method of aspect 22, further comprising: obtaining, from the device in response to the security challenge, second information indicative of a second sequence of events, wherein outputting the second security challenge is based at least in part on the second sequence of events being the same as the sequence of events.

Aspect 24: The computer-implemented method of any of aspects 22 through 23, further comprising: obtaining, from the device in response to the security challenge, second information indicative of a second sequence of events, wherein outputting the second security challenge is based at least in part on the second sequence of events being different from the sequence of events.

Aspect 25: The computer-implemented method of aspect 24, further comprising: determining that the second information corresponds to a failed attempt to solve the security challenge based at least in part on the second sequence of events being different from the sequence of events; and excluding the security challenge from a set of security challenges based at least in part on the failed attempt.

Aspect 26: The computer-implemented method of aspect 25, wherein excluding the security challenge from the set of security challenges comprises: excluding the security challenge from the set of security challenges based at least in part on determining that a rate of failed attempts to solve the security challenge satisfies a threshold.

Aspect 27: A fraud detection service for generating security challenges, comprising one or more memories storing processor-executable code, and one or more processors coupled with the one or more memories and individually or collectively operable to execute the code to cause the fraud detection service to perform a computer-implemented method of any of aspects 1 through 18.

Aspect 28: A fraud detection service for generating security challenges, comprising at least one means for performing a computer-implemented method of any of aspects 1 through 18.

Aspect 29: A non-transitory computer-readable medium storing code for generating security challenges, the code comprising instructions executable by a processor to perform a computer-implemented method of any of aspects 1 through 18.

Aspect 30: A fraud detection service for detecting fraud, comprising one or more memories storing processor-executable code, and one or more processors coupled with the one or more memories and individually or collectively operable to execute the code to cause the fraud detection service to perform a computer-implemented method of any of aspects 19 through 26.

Aspect 31: A fraud detection service for detecting fraud, comprising at least one means for performing a computer-implemented method of any of aspects 19 through 26.

Aspect 32: A non-transitory computer-readable medium storing code for detecting fraud, the code comprising instructions executable by a processor to perform a computer-implemented method of any of aspects 19 through 26.

It should be noted that the computer-implemented methods described above describe possible implementations, and that the operations and the steps may be rearranged or otherwise modified and that other implementations are possible. Furthermore, aspects from two or more of the computer-implemented methods may be combined.

The description set forth herein, in connection with the appended drawings, describes example configurations, and does not represent all the examples that may be implemented, or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by one or more processors, firmware, or any combination thereof. If implemented in software executed by one or more processors, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A computer-implemented method at a fraud detection service that comprises at least one processor, comprising:

outputting, to a first machine learning model, a first set of prompts, the first set of prompts corresponding to a plurality of image descriptions, and each prompt of the first set of prompts corresponding to a request of the first machine learning model to generate a respective image description of the plurality of image descriptions;

obtaining, from the first machine learning model, information indicative of the plurality of image descriptions generated via the first machine learning model in response to the request to generate the plurality of image descriptions indicated via the first set of prompts, each image description of the plurality of image descriptions describing a respective image of a plurality of images, wherein the plurality of image descriptions comprises a first image description set that corresponds to a sequence of events and a second image description set that is unassociated with the sequence of events;

outputting, to a second machine learning model, a second set of prompts different from the first set of prompts, each prompt of the second set of prompts corresponding to a request of the second machine learning model to generate a respective image of the plurality of images based on the respective image description;

obtaining, from the second machine learning model, the plurality of images generated via the second machine learning model in response to the request to generate the plurality of images indicated via the second set of prompts, wherein the plurality of images comprises a first image set that corresponds to the sequence of events based at least in part on the first image description set, and a second image set that is unassociated with the sequence of events based at least in part on the second image description set; and generating, via the at least one processor of the fraud detection service, a security challenge using the plurality of images, wherein the security challenge comprises a request for a user to identify the sequence of events from among the plurality of images, and wherein identification of the sequence of events is based at least in part on each image of the first image set being contextually relevant to the sequence of events.

2. The computer-implemented method of claim 1, wherein generating the security challenge comprises:
   generating a first subset of images comprising one or more images of the first image set; and
   generating a second subset of images comprising an image of the first image set and one or more images of the second image set, wherein the request to identify the sequence of events comprises a first request for the user to identify the image from among the second subset of images based at least in part on the first subset of images, and wherein identifying the image identifies the sequence of events.

3. The computer-implemented method of claim 2, wherein:
   the one or more images of the first image set comprise a first image corresponding to a first event of the sequence of events and a second images corresponding to a second event of the sequence of events, and
   identification of the image from among the second subset of images is based at least in part on the image corresponding to a third event of the sequence of events.

4. The computer-implemented method of claim 1, wherein:
   a first prompt of the first set of prompts comprises a first request for the first machine learning model to generate the first image description set, each image description of the first image description set describing a respective event of the sequence of events, and
   a second prompt of the first set of prompts comprises a second request for the first machine learning model to generate the second image description set, each image description of the second image description set describing a respective event that is unassociated with the sequence of events.

5. The computer-implemented method of claim 4, wherein a third prompt of the first set of prompts comprises a third request for the first machine learning model to eliminate an image description from the second image description set based at least in part on the image description being contextually relevant to a combination of at least two image descriptions of the first image description set.

6. The computer-implemented method of claim 4, wherein a fourth prompt of the first set of prompts comprises a fourth request for the first machine learning model to eliminate an image description from the second image description set based at least in part on a respective difference between the image description and one or more image descriptions of the first image description set satisfying a threshold.

7. The computer-implemented method of claim 1, wherein the first set of prompts indicate one or more rules associated with generation of the plurality of images.

8. The computer-implemented method of claim 7, wherein the one or more rules comprise a rule pertaining to a quantity of events associated with each image description, a rule pertaining to objects included in the first image description set, a rule pertaining to objects included in the second image description set, a rule pertaining to objects included in each image of the plurality of images, a rule pertaining to a structure of the plurality of image descriptions, or a rule pertaining to decoy objects included in at least a portion of the plurality of images, or any combination thereof.

9. The computer-implemented method of claim 1, further comprising:
   obtaining second information indicative of a second sequence of events based at least in part on the plurality of images, wherein the second information is obtained using one or more machine learning models; and
   outputting the security challenge to a device associated with a client of the fraud detection service based at least in part on the second sequence of events being different from the sequence of events.

10. A computer-implemented method at a fraud detection service, comprising:
    obtaining information indicative of a first request from a device associated with a client of the fraud detection service; and
    outputting a security challenge to the device in response to the first request, the security challenge comprising a second request for a user of the device to identify a sequence of events from among a plurality of images, wherein the plurality of images comprises a first image set that corresponds to the sequence of events and a second image set that is unassociated with the sequence of events.

11. The computer-implemented method of claim 10, wherein:
    the second request for the user to identify the sequence of events comprises a request for the user to identify an image of the first image set based at least in part on a first subset of images, identification of the image is from among a second subset of images and identifies the sequence of events, and
    the first subset of images comprises one or more images of the first image set and the second subset of images comprises the image and one or more images of the second image set.

12. The computer-implemented method of claim 11, wherein:
    the one or more images of the first image set comprise a first image corresponding to a first event of the sequence of events and a second images corresponding to a second event of the sequence of events, and
    the identification of the image from among the second subset of images is based at least in part on the image corresponding to a third event of the sequence of events.

13. The computer-implemented method of claim 10, further comprising:
    outputting a second security challenge, wherein the second security challenge comprises a third request for the user of the device to identify a third sequence of events from among a second plurality of images.

14. The computer-implemented method of claim 13, further comprising:
    obtaining, from the device in response to the security challenge, second information indicative of a second sequence of events, wherein outputting the second security challenge is based at least in part on the second sequence of events being a same sequence as the sequence of events.

15. The computer-implemented method of claim 13, further comprising:
    obtaining, from the device in response to the security challenge, second information indicative of a second sequence of events, wherein outputting the second security challenge is based at least in part on the second sequence of events being different from the sequence of events.

16. The computer-implemented method of claim 15, further comprising:
    determining that the second information corresponds to a failed attempt to solve the security challenge based at least in part on the second sequence of events being different from the sequence of events; and
    excluding the security challenge from a set of security challenges based at least in part on the failed attempt.

17. The computer-implemented method of claim 16, wherein excluding the security challenge from the set of security challenges comprises:
    excluding the security challenge from the set of security challenges based at least in part on determining that a rate of failed attempts to solve the security challenge satisfies a threshold.

18. A fraud detection service for generating security challenges, comprising:
    a processing system that includes processor circuitry and memory circuitry that stores code, the processing system configured to cause the fraud detection service to:
        output, to a first machine learning model, a first set of prompts, the first set of prompts corresponding to a plurality of image descriptions, and each prompt of the first set of prompts corresponding to a request of the first machine learning model to generate a respective image description of the plurality of image descriptions;
        obtain, from the first machine learning model, information indicative of the plurality of image descriptions generated via the first machine learning model in response to the request to generate the plurality of image descriptions indicated via the first set of prompts, each image description of the plurality of image descriptions describing a respective image of a plurality of images, wherein the plurality of image descriptions comprises a first image description set that corresponds to a sequence of events and a second image description set that is unassociated with the sequence of events;
        output, to a second machine learning model, a second set of prompts different from the first set of prompts, each prompt of the second set of prompts corresponding to a request of the second machine learning model to generate a respective image of the plurality of images based on the respective image description;
        obtain, from the second machine learning model, the plurality of images generated via the second machine learning model in response to the request to generate the plurality of images indicated via the second set of prompts, wherein the plurality of images comprises a first image set that corresponds to the sequence of events based at least in part on the first image description set, and a second image set that is unassociated with the sequence of events based at least in part on the second image description set; and
        generate a security challenge using the plurality of images, wherein the security challenge comprises a request for a user to identify the sequence of events from among the plurality of images, and wherein identification of the sequence of events is based at least in part on each image of the first image set being contextually relevant to the sequence of events.

19. The fraud detection service of claim 18, wherein, to generate the security challenge, the processing system is further configured to cause the fraud detection service to:
    generate a first subset of images comprising one or more images of the first image set; and
    generate a second subset of images comprising an image of the first image set and one or more images of the second image set, wherein the request to identify the sequence of events comprises a first request for the user to identify the image from among the second subset of images based at least in part on the first subset of images, and wherein identifying the image identifies the sequence of events.

20. The fraud detection service of claim 18, wherein:
    a first prompt of the first set of prompts comprises a first request for the first machine learning model to generate the first image description set, each image description of the first image description set describing a respective event of the sequence of events, and
    a second prompt of the first set of prompts comprises a second request for the first machine learning model to generate the second image description set, each image description of the second image description set describing a respective event that is unassociated with the sequence of events.

* * * * *